(12) United States Patent
Warsowe et al.

(10) Patent No.: US 9,644,354 B2
(45) Date of Patent: May 9, 2017

(54) FOOT ACTUATED FLUID CONTROL VALVE

(71) Applicants: Marc Warsowe, Redwood City, CA (US); Adam Hagmann, Brentwood, CA (US); Christopher Kirn, Campbell, CA (US); Jeff Horwitz, Campbell, CA (US); Eric Robinson, Eagle, ID (US)

(72) Inventors: Marc Warsowe, Redwood City, CA (US); Adam Hagmann, Brentwood, CA (US); Christopher Kirn, Campbell, CA (US); Jeff Horwitz, Campbell, CA (US); Eric Robinson, Eagle, ID (US)

(73) Assignee: 456CORP, Redwood City, CA (US)

( * ) Notice: Subject to any disclaimer, the term of this patent is extended or adjusted under 35 U.S.C. 154(b) by 16 days.

(21) Appl. No.: 14/833,043

(22) Filed: Aug. 22, 2015

(65) Prior Publication Data

US 2015/0361644 A1 Dec. 17, 2015

Related U.S. Application Data

(63) Continuation-in-part of application No. 14/079,835, filed on Nov. 14, 2013, now Pat. No. 9,157,548.

(Continued)

(51) Int. Cl.
*F16K 31/46* (2006.01)
*E03C 1/05* (2006.01)
(Continued)

(52) U.S. Cl.
CPC ............ *E03C 1/052* (2013.01); *F16K 27/041* (2013.01); *F16K 31/465* (2013.01); *F16K 31/62* (2013.01);

(Continued)

(58) Field of Classification Search
CPC ..... Y10T 137/87153; Y10T 137/87161; Y10T 137/86558; E03C 1/052; F16K 27/041;
(Continued)

(56) References Cited

U.S. PATENT DOCUMENTS 289,937 A 12/1883 Smith
938,613 A 11/1909 Sieben
(Continued)

FOREIGN PATENT DOCUMENTS

WO 2005078324 A1 8/2005

*Primary Examiner* — Matthew W Jellett
(74) *Attorney, Agent, or Firm* — Hackler Daghighian Martino & Novak

(57) ABSTRACT

A hands-free faucet control device includes a water valve assembly, a foot peddle assembly and a pull wire connected there between. A continuously-formed injection molded valve housing includes two cylindrically-shaped apertures disposed adjacent to one another where each has an inlet water port and an outlet water port. A valve is disposed in each of the apertures, where both valves are simultaneously movable between a closed position and an open position. A foot pedal assembly includes a foot peddle bracket and an attached foot pedal, where the foot pedal is movable between an up position and a down position. A pull wire is connected at a pull wire first end to the proximal end of the valve and connected at a pull wire second end to the foot pedal, wherein movement of the foot pedal to the down position by a user moves the valves to the open position.

26 Claims, 26 Drawing Sheets

Related U.S. Application Data

(60) Provisional application No. 61/727,033, filed on Nov. 15, 2012, provisional application No. 61/861,935, filed on Aug. 2, 2013, provisional application No. 62/041,005, filed on Aug. 22, 2014, provisional application No. 62/116,539, filed on Feb. 15, 2015.

(51) Int. Cl.
| | |
|---|---|
| *F16K 31/62* | (2006.01) |
| *F16K 27/04* | (2006.01) |
| *G05G 1/44* | (2008.04) |

(52) U.S. Cl.
CPC ........ *G05G 1/44* (2013.01); *Y10T 137/87161* (2015.04); *Y10T 137/87579* (2015.04)

(58) Field of Classification Search
CPC ........ F16K 31/46; F16K 31/465; F16K 31/62; G05G 1/44
USPC .............. 137/595; 251/322; 4/623
See application file for complete search history.

(56) References Cited

U.S. PATENT DOCUMENTS

| | | | |
|---|---|---|---|
| 946,477 A | 1/1910 | Wentzell | |
| 1,212,085 A | 1/1917 | Metcalf | |
| 1,266,509 A | 5/1918 | McKee | |
| 1,318,120 A | 10/1919 | Wheaton | |
| 1,364,555 A | 1/1921 | Hunt | |
| 1,838,456 A | 3/1932 | Beebe | |
| 2,188,258 A | 1/1940 | Zinkil | |
| 2,467,065 A | 4/1949 | White | |
| 2,830,618 A | 4/1958 | Mitchell | |
| 3,218,023 A | 11/1965 | Kirkup | |
| 3,594,828 A | 7/1971 | Seek | |
| 3,847,210 A | 11/1974 | Wells | |
| 3,865,139 A | 2/1975 | Tolnai | |
| 3,937,253 A | 2/1976 | Lilja | |
| 3,973,583 A | 8/1976 | Sorenson | |
| 5,199,119 A | 4/1993 | Weber | |
| 5,230,365 A | 7/1993 | Woltz et al. | |
| 5,263,684 A | 11/1993 | McGuire | |
| 5,285,815 A * | 2/1994 | Henry | B67D 1/0044 137/595 |
| 5,307,837 A * | 5/1994 | Woltz | F16K 31/088 137/607 |
| 5,322,084 A | 6/1994 | Ghiassian | |
| 5,386,600 A | 2/1995 | Gilbert, Sr. | |
| 5,511,763 A | 4/1996 | Green | |
| 5,716,039 A * | 2/1998 | Jones | D05B 81/00 112/282 |
| 6,814,337 B2 | 11/2004 | Schmaltz | |
| 6,886,508 B1 | 5/2005 | Luffy | |
| 7,374,147 B2 | 5/2008 | Nohl et al. | |
| 8,307,851 B2 | 11/2012 | Warsowe | |
| 2011/0001075 A1 | 1/2011 | Warsowe | |

* cited by examiner

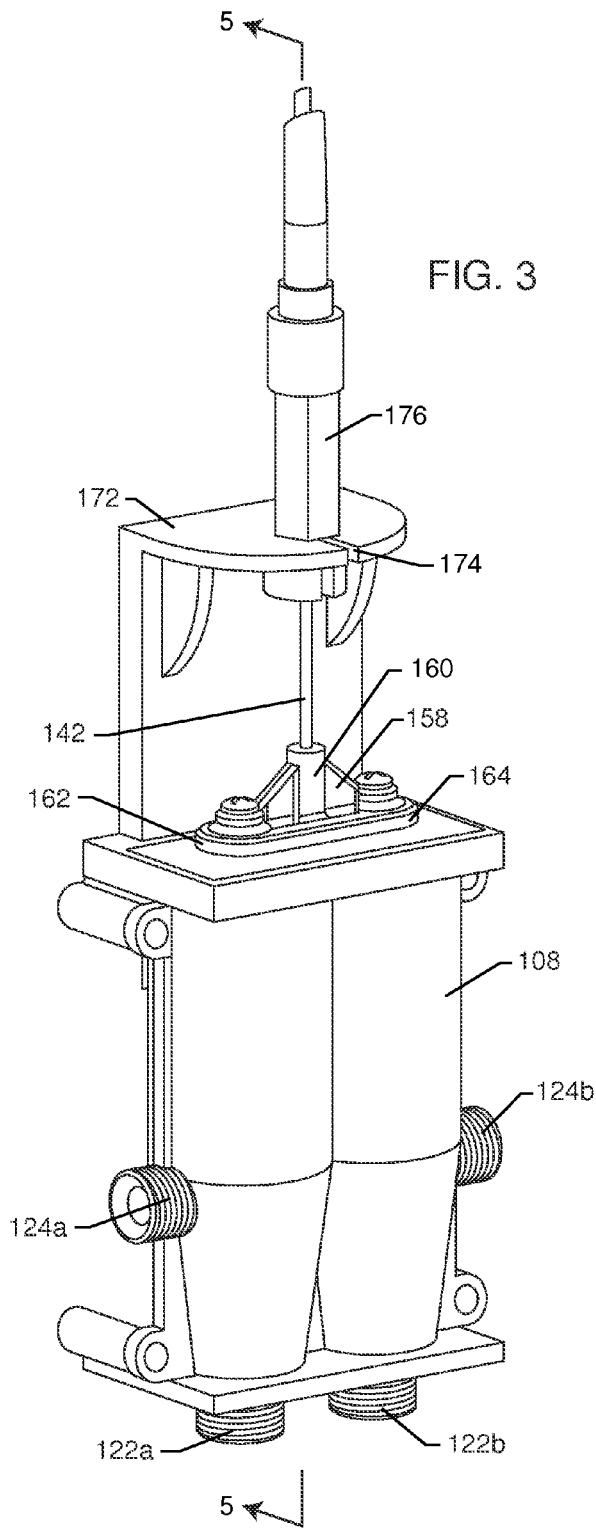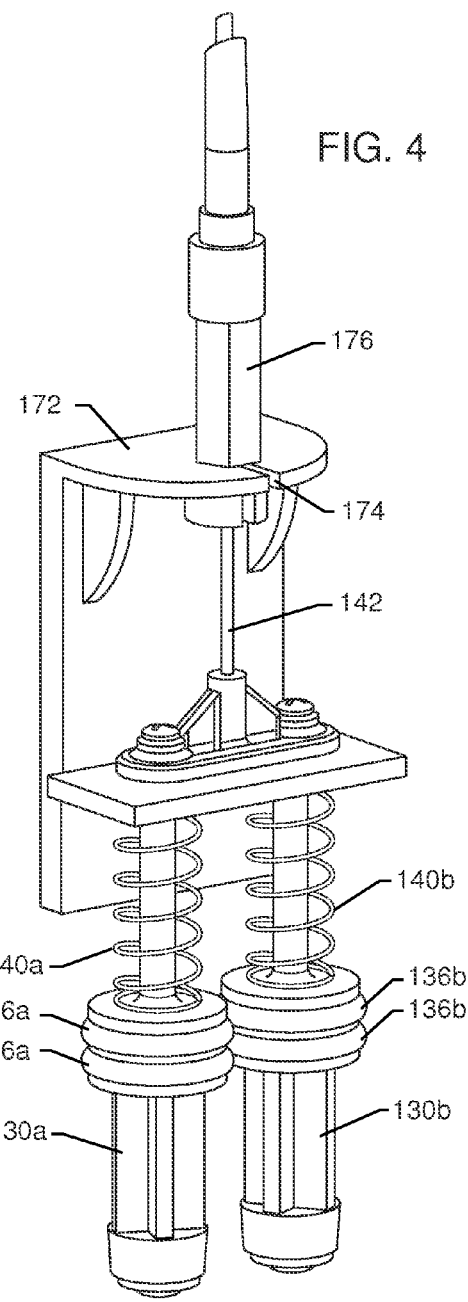

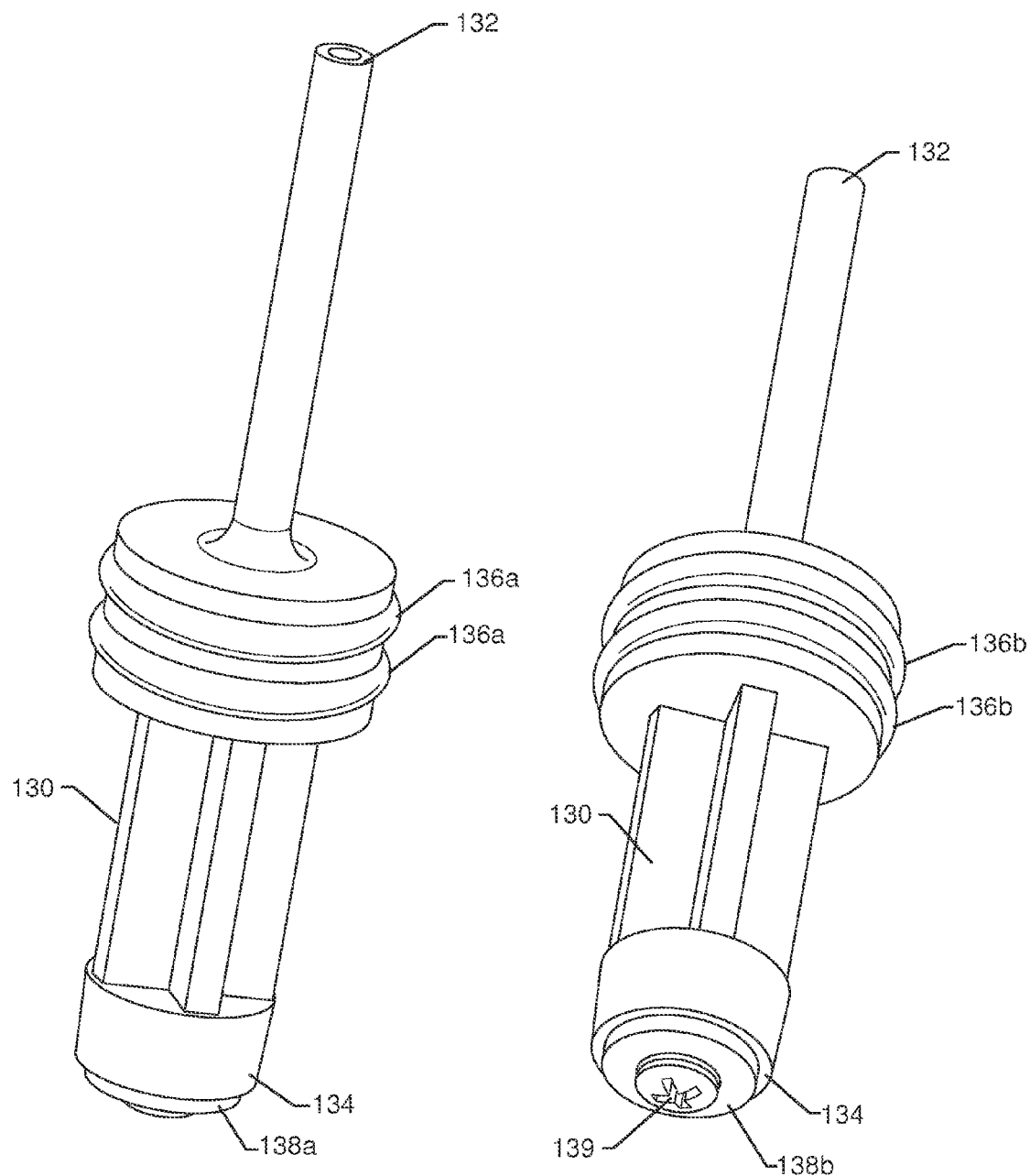

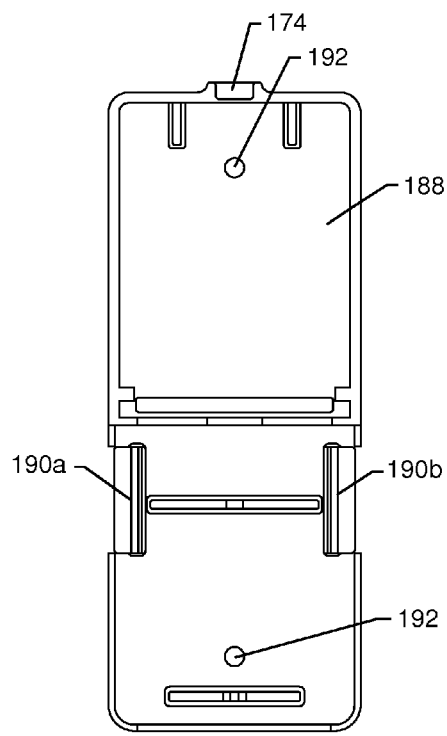 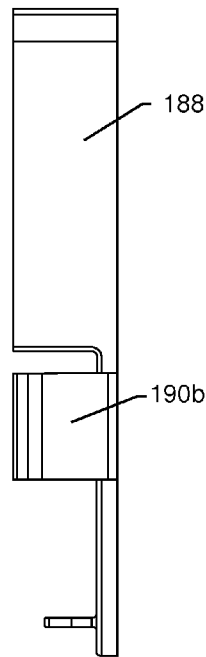 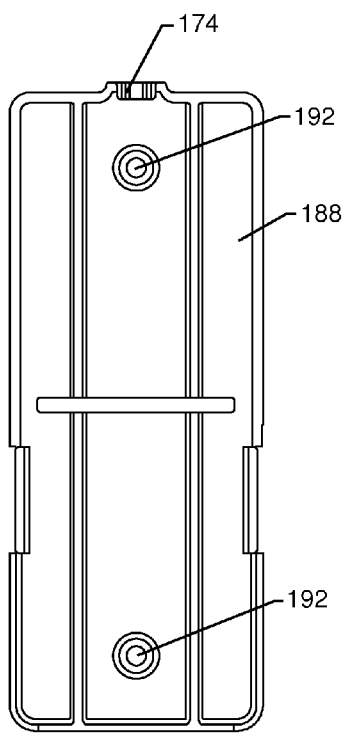
FIG. 17  FIG. 18  FIG. 19
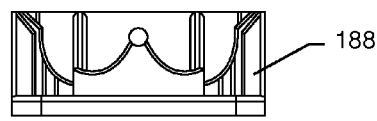
FIG. 20

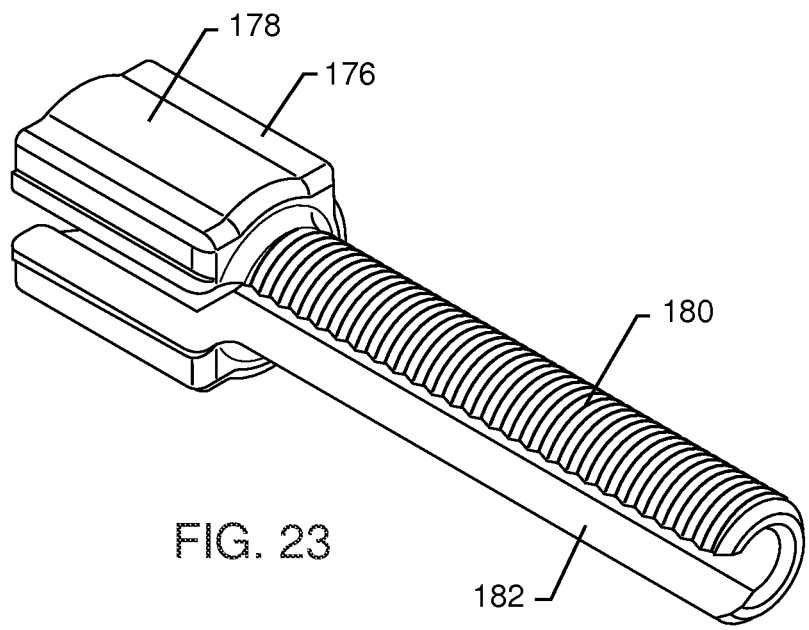
FIG. 23
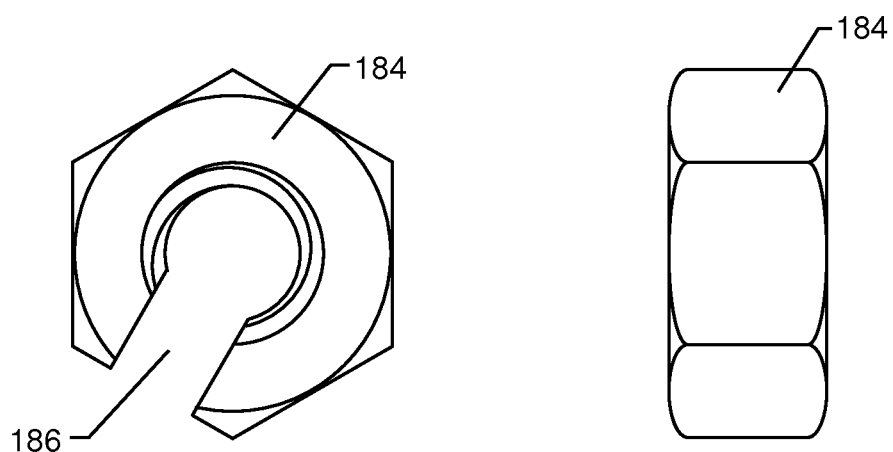
FIG. 24
FIG. 25

FOOT ACTUATED FLUID CONTROL VALVE

CROSS-REFERENCE TO RELATED APPLICATIONS

This application is a continuation-in-part of application Ser. No. 14/079,835 filed on Nov. 14, 2013, which itself claimed priority to provisional applications 61/727,033 filed on Nov. 15, 2012 and 61/861,935 filed on Aug. 2, 2013. This application also claims priority to provisional applications 62/041,005 filed on Aug. 22, 2014 and 62/116,539 filed on Feb. 15, 2015. The entire contents of all of the above mentioned applications are fully incorporated herein with these references.

DESCRIPTION

Field of the Invention

The present invention generally relates to plumbing. More specifically, the present invention relates to improvements for a foot actuated fluid control valve, otherwise commonly referred to as a foot actuated faucet.

Background of the Invention

This patent application is an improvement to the previously filed U.S. Pat. No. 8,307,851 issued on Nov. 13, 2012, the contents of which are fully incorporated herein in its entirety.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Faucets and faucet sets are known. Some faucet sets have two separate faucet valves and a valve handle for each faucet valve, one for hot water and one for cold water, respectively. Each valve and handle controls the amount of flow of hot and cold water, respectively, and thereby controls the total flow, as well as the temperature of the water. Today, faucet sets with two faucet valves and two handles typically have only one faucet spout through which mixed hot and cold water is discharged. However, some older dual-valve faucet sets may have two faucet spouts, one for each valve and handle, respectively. Other faucet sets control both the hot water and cold water with a single faucet valve and handle that controls the amount of flow of both hot and cold water in one action, thereby controlling the total flow, as well as the temperature of the water, in one action. Faucet sets with a single faucet valve have one faucet spout, through which the mixed hot and cold water flows.

Faucet sets are mentioned in many places in the remainder of this specification. Some examples of faucet sets include, but are not limited to, any water delivery plumbing device comprised of a single faucet valve and handle or a dual faucet value and two handles, plus one or more faucet spouts. For the purpose of this specification, any and all faucet sets may be referred to in the singular as a faucet. In the remainder of this specification, faucet sets may also be referred to simply as faucets. In addition, faucet spouts are mentioned in many places in the remainder of this specification. Examples of faucet spouts include, but are not limited to, a spout, spigot, bibb, bibcock, hydrant, nozzle, stopcock, tap, valve, or other outlet for water. In the remainder of this specification, faucet spouts may also be referred to simply as spouts.

U.S. Pat. No. 8,307,851 taught that a sink or other container may be provided with a user-controlled flow control device ("flow control device" or "FDC") in addition to a faucet that controls the temperature and flow rate of the water issuing from the faucet spout. The flow control device may be mechanical, electrical, electronic, hydraulic, pneumatic, or a combination of mechanical, electrical, electronic, hydraulic, and/or pneumatic. The flow control device affects only the flow after the temperature of the water, which is a ratio of hot water to cold water, and the flow rate have been initially selected or subsequently readjusted by the user of the faucet. The activator of the flow control device could be an additional knob on the faucet, a foot, knee, waist, or thigh pedal, push bar, or button, and/or a photo or voice sensor, or some other activator device, mechanical, electrical, electronic, hydraulic, pneumatic, or otherwise. For example, the activator may be a button that is pressed with the toe or sole of the foot; or a pressure bar at the front of the sink which can be activated with the knee, hip, or stomach; or by a photoelectric or motion-sensing device; or by a voice-activated device. (For the purpose of this specification, the word "actuator" is used interchangeably to represent any or all of the aforementioned activator devices. Moreover, anywhere in the specification where the word "pedal" appears, any of the other actuators may be specified to obtain another embodiment.) In an embodiment, the default position of the flow control device is "off," i.e., when the user has not activated the flow control device, or has ceased to activate the flow control device, no water flows through the faucet.

In an embodiment, the user first opens the valves in the flow control device by activating the actuator. With the flow control device now "on," the user then sets the desired temperature and maximum flow rate by adjusting the amount of hot and cold water at the faucet. After the user has initially set, or has readjusted, the water temperature and flow, the flow control device allows the user to shut off the flow of water partially or completely without again touching the faucet by ceasing to activate, or by only partially activating, the actuator. When the user wishes to restore water flow, or to increase water flow by any amount up to the full amount set at the faucet, he or she engages the FDC actuator, which then "recalls" the temperature and maximum flow rate (or a portion thereof) to which the faucet had been previously set.

For example, if the user wishes to rinse a stack of dishes before placing them in the dishwasher, he or she would only need to initially turn on the water at the faucet to the desired temperature and flow while activating the flow control device to "on." The user rinses the first dish, then ceases to activate the flow control device, which turns the flow control device "off," which in-turn blocks the water flow to the faucet, as he or she places the dish in the dishwasher. To rinse the second dish, the user again activates the flow control device, and again water flows from the faucet at the user's desired pre-set flow and temperature. Again, while the user is placing the second dish in the dishwasher, he or she ceases to activate the flow control device and the water flow is again interrupted. The ability to turn the faucet on and off repeatedly at the same pre-set temperature and flow is in contrast to other pedal-type water faucets that merely substitute pedals for hand faucets. In other words, the flow control device facilitates repetitive use of the faucet at the desired flow and temperature consistently, conveniently, and easily. Also, current pedal-faucets have no ability, or only a limited ability, to make fine adjustments to the temperature or flow, thereby rendering current pedal faucets largely unsuitable for household or commercial kitchen and bathroom sinks.

Installation of the flow control device is easy, generally requiring only a wrench and screwdriver for flexible water pipes and little or no plumbing skills. For example, in a typical residential environment, the installer opens the under-sink cabinet to access the current water pipes, shuts the hot and cold water off at their respective shut-off valves, unscrews and removes the existing water pipes, screws the FDC housing onto the back wall of the under-sink cabinet, and connects new flexible water pipes from the shut-off valves to the faucet control device and from the faucet control device to the faucet. The installer then attached the pull cable to the rack in the flow control device and secures the cable to the walls of the cabinet so that the cable then emerges at the front of the cabinet or elsewhere at the place where the actuator will be positioned. The installer attaches the actuator to the cabinet (typically in the toe-space below the cabinet) or as elsewhere desired and then attaches the cable to the actuator. If required, the installer adjusts the travel of the cable and rack by moving the cotter pin, which attaches the cable to the rack, to one of several different positions on the rack, and/or replaces the pinions on the flow control device with different size pinions. After testing the system, the installation process is complete. After installation, the flow control device is easily accessible to the user, if, for example, the user wishes to install a new sink and/or faucet. In a commercial environment where flexible pipes are being used, the under-sink area is frequently not enclosed in a cabinet, making installation of the flow control device that much easier. Some level of expert plumbing knowledge would be necessary only in situations in which rigid water pipes are in use.

In an embodiment, the flow control device is installed on paired hot and cold water pipes that supply water to a faucet. In an embodiment, as soon as the FDC actuator is released, the water flow stops. Consequently, water is conserved, because as soon as the user ceases to activate the flow control device, water usage ceases. Alternatively, water can also be conserved when the user only partially activates the flow control device, which results in less than the pre-set maximum flow rate passing through the flow control device to the faucet.

The flow control device may be installed at any point along the water pipes that supply the faucet, so long as the flow control device is installed on both water pipes, hot and cold, that supply the faucet. Alternatively, the flow control device may be installed on a single pipe that contains both hot and cold water after the hot and cold water has been mixed. In an embodiment in which the flow control device is installed on both pipes, if the pipes are close enough together, a single flow control device may be used to control the flow of the water through both pipes. In contrast, if the pipes are separated by some distance, rendering use of a single flow control device impractical, two separate flow control devices can be installed, one on each water pipe, and both flow control devices may be connected to the same actuator or be otherwise coordinated to open and close together. Flexible or rigid water pipes may be used to connect the flow control device to the water shut-off valves, and to connect the flow control device to the faucet. However, as noted above, using rigid pipe typically requires a higher level of expertise and more time to install. The FCD actuator may be any device that activates the flow control device, thereby opening the valves and permitting water to flow. Examples include, but are not limited to: a foot pedal installed in the toe-space under a sink on which the user steps; a lever activated by moving the foot to the side, applying lateral pressure to the lever; or any of the other actuators described above. In an embodiment, the actuator may be responsive to different pressures, enabling the user to control flow by applying different amounts of pressure or otherwise activating the actuator only partially.

A problem not realized and addressed in the U.S. Pat. No. 8,307,851 patent was that using a single flow control device as previously suggested in a single pipe that contained both hot and cold water resulted in the inability to control a varying range of final temperatures at the faucet. This is because the hot and cold water would need to be mixed before reaching the hot and cold faucet valves. Also, if you wanted to keep the ability to adjust the hot and cold water temperature, it required the installation of two flow control devices. Also, it is desired that the flow control device could be simplified thereby lowering the cost and improving the reliability of the overall system. Accordingly, there is a need for an improved flow control device that is more reliable, easier to install and cheaper to produce. The present invention fulfills these needs and provides other related advantages.

SUMMARY OF THE INVENTION

An exemplary embodiment of a hands-free faucet control device is disclosed. A water valve assembly includes a continuously-formed injection molded valve housing. The valve housing has two cylindrically-shaped apertures disposed adjacent to one another. Each cylindrically-shaped aperture has an open first end opposite a frustoconically-shaped second end. An axis of revolution is defined through the cylindrically-shaped aperture and frustoconically-shaped second end. Each frustoconically-shaped second end has a wide end opposite a narrow end, where the wide end is connected and contiguous to the cylindrically-shaped aperture. A first fluid connection port is connected at the narrow end. Each cylindrically-shaped aperture has a second fluid connection port disposed between the narrow end of the frustoconically-shaped second end and the open first end of the cylindrically-shaped aperture. The first and second fluid connection ports are in fluidic communication with an interior portion of their respective frustoconically-shaped second ends. Each cylindrically-shaped aperture and frustoconically-shaped second end are not in fluidic communication with the adjacently disposed cylindrically-shaped aperture and frustoconically-shaped second end. The valve housing may include continuously-formed fastening holes for attaching the housing to various structures.

There are two valves, where each valve is disposed within one of the respective cylindrically-shaped apertures and frustoconically-shaped second ends. Each valve is translatable along their respective axis of revolution. Each valve has a proximal end opposite a distal end. The valves are simultaneously movable between a closed position and an open position.

There are a pair of first fluidic seals, where each first fluidic seal is disposed between its respective valve and the cylindrically-shaped aperture. The pair of first fluidic seals prevent a fluid from flowing thereby.

There are a pair of second fluidic seals, where each second fluidic seal is disposed between its respective distal end of the valve and the narrow end of the frustoconically-shaped second end. The valves open and close as they simultaneously translate. The valves opening and closing either opens or stops fluidic communication between the first fluid connection ports and the interior portion of the frustoconically-shaped second ends.

There are a pair of springs, where each spring presses against their respective valves biasing the valves towards the closed position. The spring may be a compression spring.

A foot pedal assembly includes a foot peddle bracket attachable to a structural support, where the structural support for the foot peddle bracket can be a wall, a cabinet or a floor. A foot pedal is attached to the foot peddle bracket. The foot pedal is movable between an up position and a down position.

A pull wire is connected at a pull wire first end to the proximal end of the valve and connected at a pull wire second end to the foot pedal. Movement of the foot pedal to the down position by a user moves the valves to the open position. The pull wire may comprises a sheathing that allows the pull wire to easily translate and move within.

Other exemplary embodiments may include a cap attached to the valve housing disposed at the open first ends. The cap includes a pair of holes which are aligned with the proximal ends of the two valves. The pair of springs are captured between the cap and their respective valves.

A pull wire connector may be attached at a middle portion to the pull wire first end. The pull wire connector has a left portion opposite a right portion about the middle portion. The left portion is connected to the proximal end of one of the two valves, and the right portion is connected to the proximal end of the other of the two valves.

A bracket may be attached to the valve housing, where the bracket includes a pull wire alignment aperture disposed above the middle portion of the pull wire connector.

A pull wire tensioner may be disposed within the pull wire alignment aperture of the bracket. The pull wire is captured and disposed through the pull wire tensioner, where the pull wire tensioner is adjustably positioned in a translational direction which can move closer to and further from the pull wire connector thereby adjusting the tension of the pull wire.

A back plate may capture the valve housing through the use of at least one flexure. The back plate may include fastening holes. The back plate may include a pull wire alignment aperture disposed above the middle portion of the pull wire connector.

A pull wire tensioner may be disposed within the pull wire alignment aperture of the back plate. The pull wire may captured and disposed through the pull wire tensioner, where the pull wire tensioner is adjustably positioned in a translational direction which can move closer to and further from the pull wire connector thereby adjusting the tension of the pull wire.

A lock-on may be included, where the lock-on is configured to be placed by the user between the cap and the pull wire connector which then forces the two valves into the open position. The lock-on may include an acutely-angled insert end that is configured to be wedged between the cap and the valve housing by the user.

A foot activated hold-down switch may be pivotably or flexurally attached to the foot pedal bracket. The foot activated hold-down switch may include a protrusion configured to engage a notch located on the foot peddle bracket.

The foot peddle may be pivotably connected to the foot peddle bracket about a pivot axis. The foot peddle may include a plurality of pull wire connections for the pull wire second end to connect to, where the plurality of pull wire connections are at a varying distance from the pivot axis.

A torque increasing lever may be included, where the torque increasing lever is pivotably attached to the structural support or to a second structural support. The pull wire may comprises a first section which is separate from a second section, where the first section comprises the pull wire first end opposite a first lever connection, and the second section comprises the pull wire second end opposite a second lever connection. The first and second lever connections are pivotably coupled to the torque increasing lever at a distance apart from one another.

The pair of second fluidic seals may be fastened onto their respective distal ends of the pair of valves or the pair of second fluidic seals may be molded onto their respective distal ends of the pair of valves.

The pair of first fluidic seals may comprise o-ring seals. Each first fluidic seal of the pair of first fluidic seals may comprise at least two o-rings disposed adjacently to one another.

In another exemplary embodiment, the distal end of each valve may be frustoconically-shaped. Furthermore, the frustoconically-shaped distal end of each valve may match the shape of the frustoconically-shaped second end of the valve housing.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 3 is a close-up perspective view of an exemplary valve assembly of the present invention;

FIG. 4 is a view similar to FIG. 4 but now with the valve housing removed;

FIG. 6 is a perspective view of an exemplary valve of the present invention;

FIG. 7 is a perspective view of a similar valve to FIG. 6 now at a different angle;

FIG. 17 is a front view of an exemplary back plate;

FIG. 18 is a right side view of the structure of FIG. 17;

FIG. 19 is a back view of the structure of FIG. 17;

FIG. 20 is a bottom view of the structure of FIG. 17;

FIG. 23 is a perspective view of an exemplary pull wire tensioner;

FIG. 24 is a top view of an exemplary nut;

FIG. 25 is the side view of the structure of FIG. 24;

FIG. 27 is a perspective view of an exemplary lock-on;

FIG. 28 is a perspective view of another exemplary lock-on;

FIG. 29 is a perspective view of another exemplary lock-on;

DETAILED DESCRIPTION OF THE PREFERRED EMBODIMENTS

Figure 1:
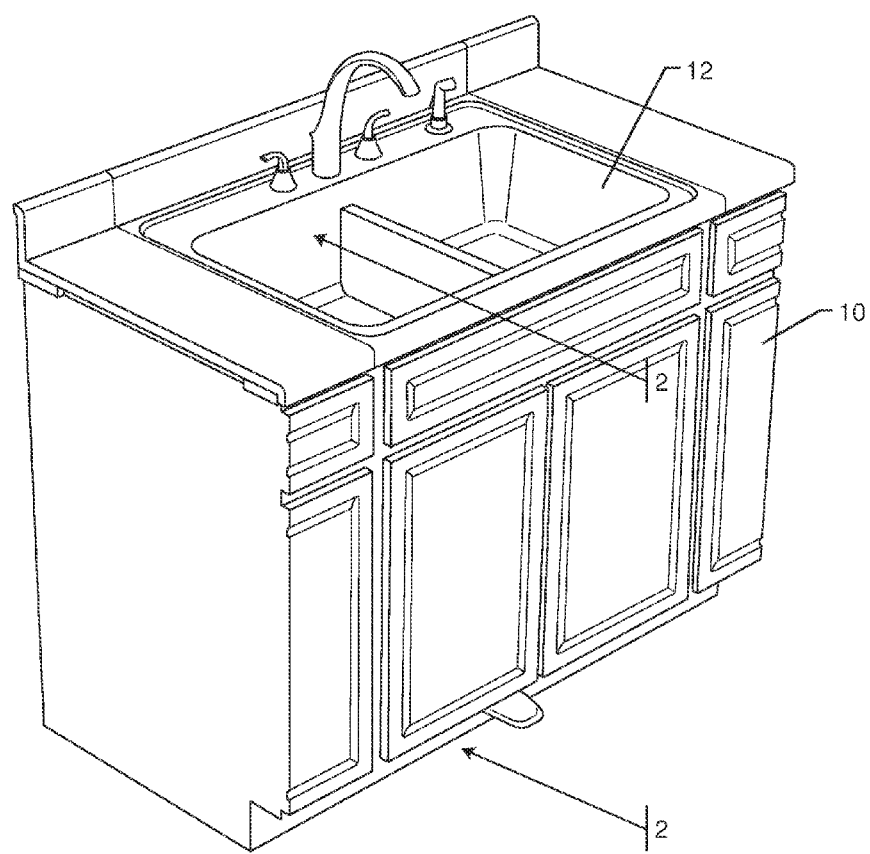
FIG. 1 is a perspective view of a cabinet with a sink that would house the present invention.
Figure 2:
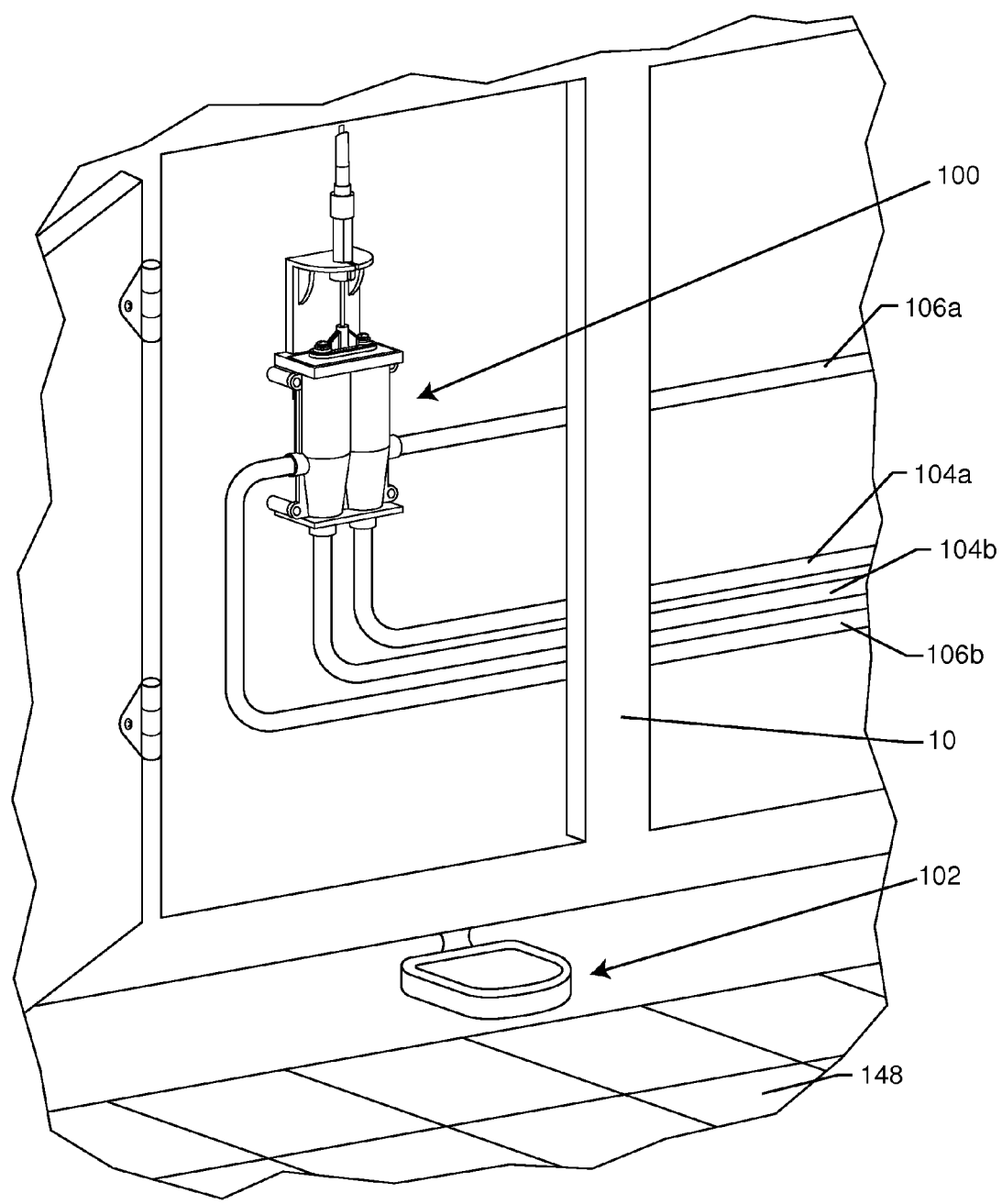
FIG. 2 is a perspective view of the cabinet of FIG. 1 taken along lines 2-2 now opened showing an embodiment of the present invention as a valve assembly and a foot pedal assembly.

An exemplary embodiment of a hands-free faucet control device is disclosed. FIG. 1 is a perspective view of a cabinet 10 with a sink 12 that would house the present invention. FIG. 2 is a perspective view of the cabinet of FIG. 1 now opened showing an embodiment of the present invention as a valve assembly 100 and a foot pedal assembly 102. As shown herein, two water lines 104a and 104b run into the valve assembly 100 and two water lines 106a and 106b run out of the valve assembly 100. This means that any of the two incoming lines could be either a hot or a cold water inlet line. Also, any two outgoing lines could be either a hot or cold water outlet line. It is noted herein, the position of the lines could be switched such that the bottom most lines are the inlet lines or alternatively could be the outlet lines.

Figure 8:
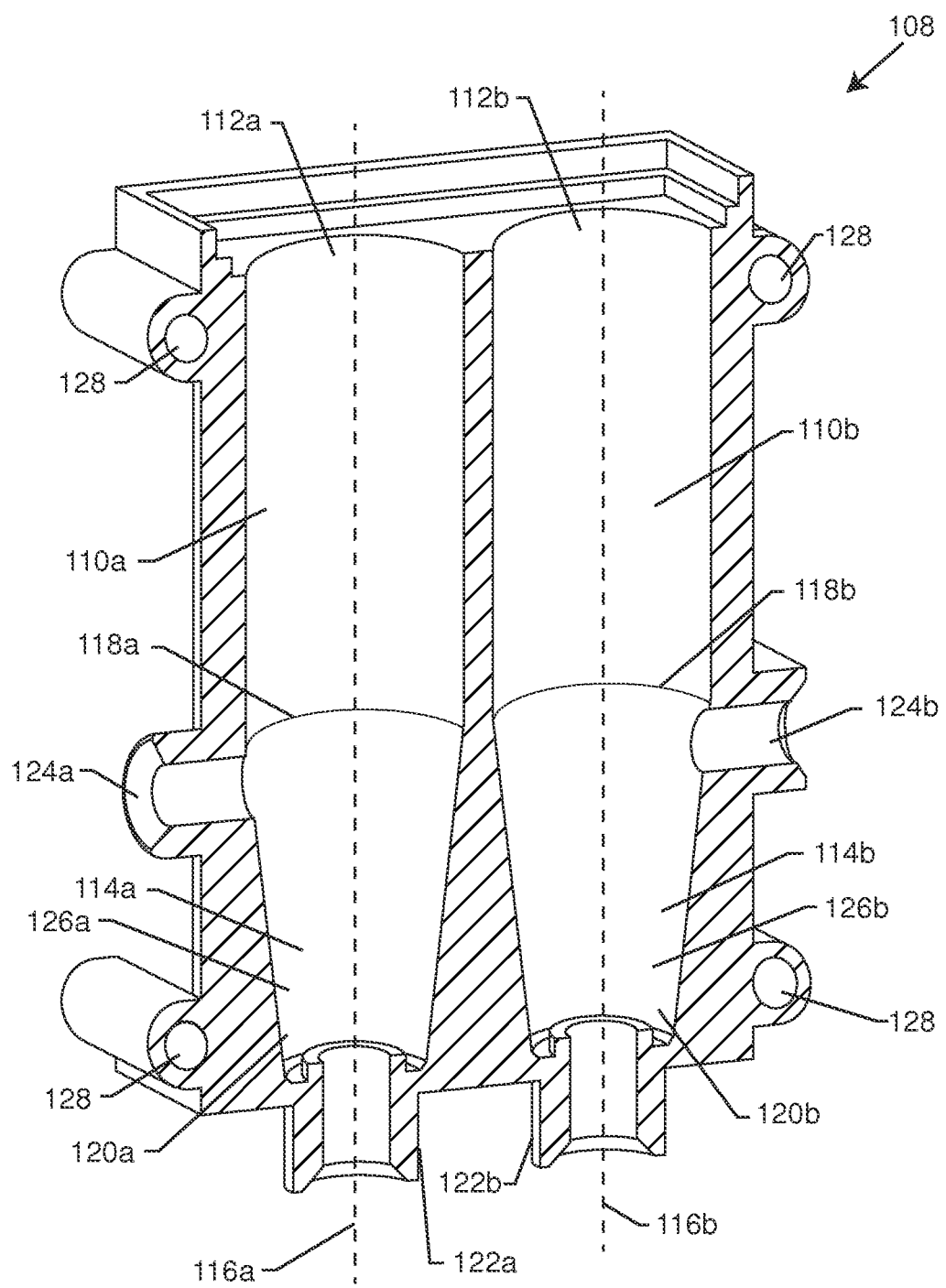
FIG. 8 is a sectional view similar to FIG. 5 but now just showing the valve housing.

Referring now to FIG. 8, a continuously-formed injection molded valve housing 108 is shown. The valve housing 108 has two cylindrically-shaped apertures 110a and 110b disposed adjacent to one another. Each cylindrically-shaped aperture 110 has an open first end 112a and 112b opposite a frustoconically-shaped second end 114a and 114b. An axis of revolution 116a and 116b is defined through the cylindrically-shaped aperture 110 and frustoconically-shaped second end 114. Each frustoconically-shaped second end 114 has a wide end 118a and 118b opposite a narrow end 120a and 120b, where the wide end 118 is connected and contiguous to the cylindrically-shaped aperture 110.

A first fluid connection port 122a and 122b is connected at the narrow end 120. Each cylindrically-shaped aperture 110 has a second fluid connection port 124a and 124b disposed between the narrow end 120 of the frustoconically-shaped second end 114 and the open first end 112 of the cylindrically-shaped aperture 110. The first and second fluid connection ports are in fluidic communication with an interior portion 126a and 126b of their respective frustoconically-shaped second ends 114. Each cylindrically-shaped aperture 110a and frustoconically-shaped second end 114a are not in fluidic communication with the adjacently disposed cylindrically-shaped aperture 110b and frustoconically-shaped second end 114b. The valve housing 108 may include continuously-formed fastening holes 128 for attaching the valve housing 108 to various structures.

Figure 31:
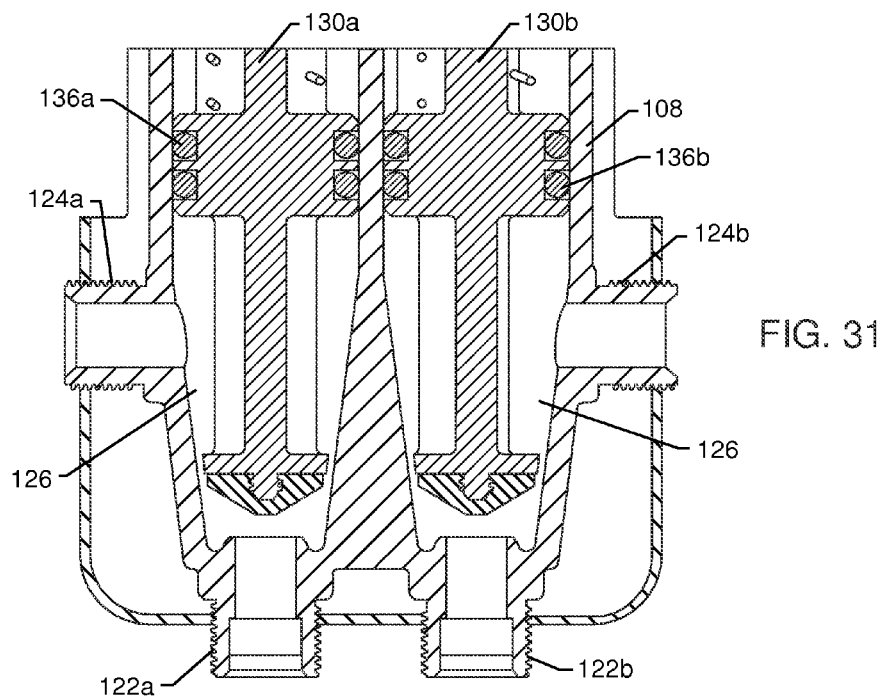
FIG. 31 is a close-up, front, sectional view of the structure of FIG. 22 taken along lines 31-31 showing the valves in the open position.
Figure 32:
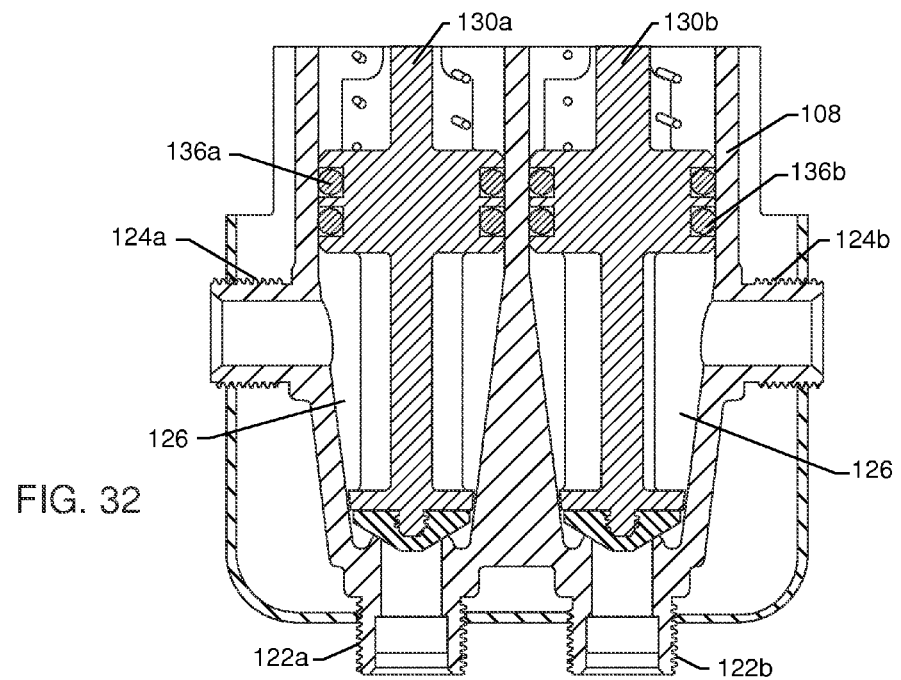
FIG. 32 is a close-up, front, sectional view of the structure of FIG. 22 taken along lines 32-32 showing the valves in the closed position.
Figure 33:
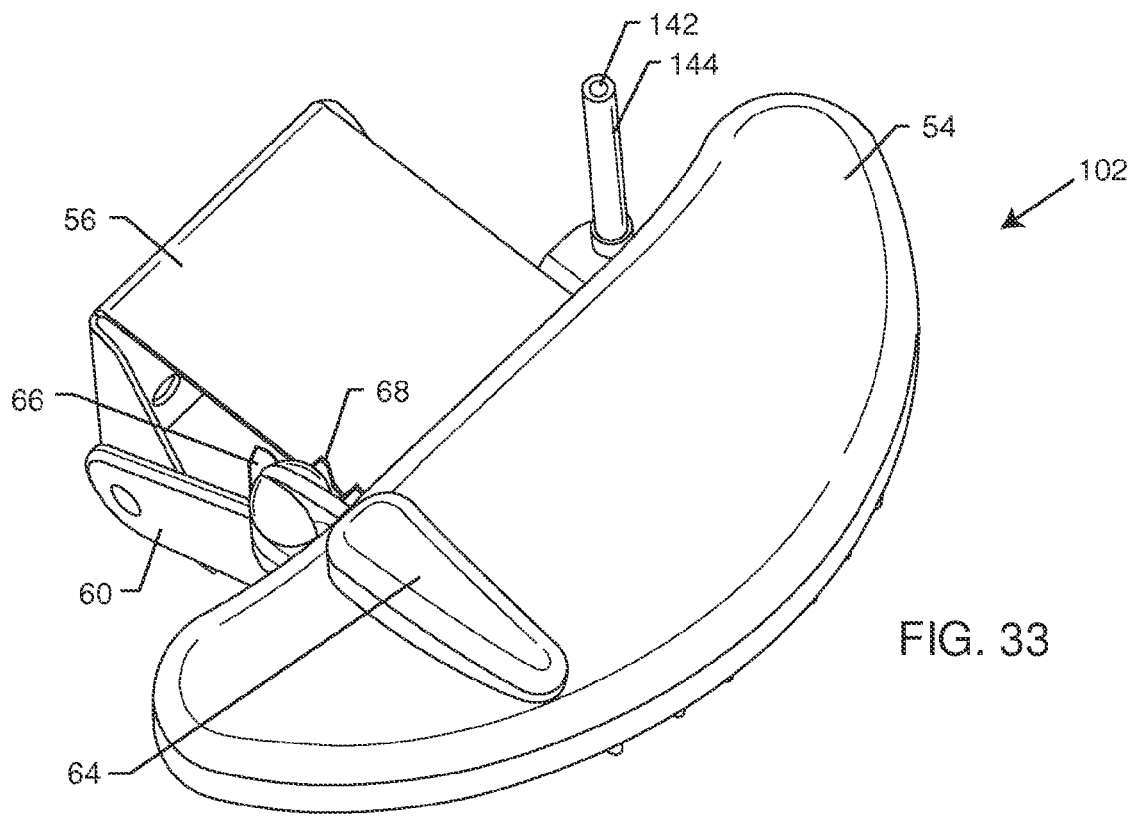
FIG. 33 is a perspective view of an exemplary foot pedal assembly of the present invention.
Figure 34:
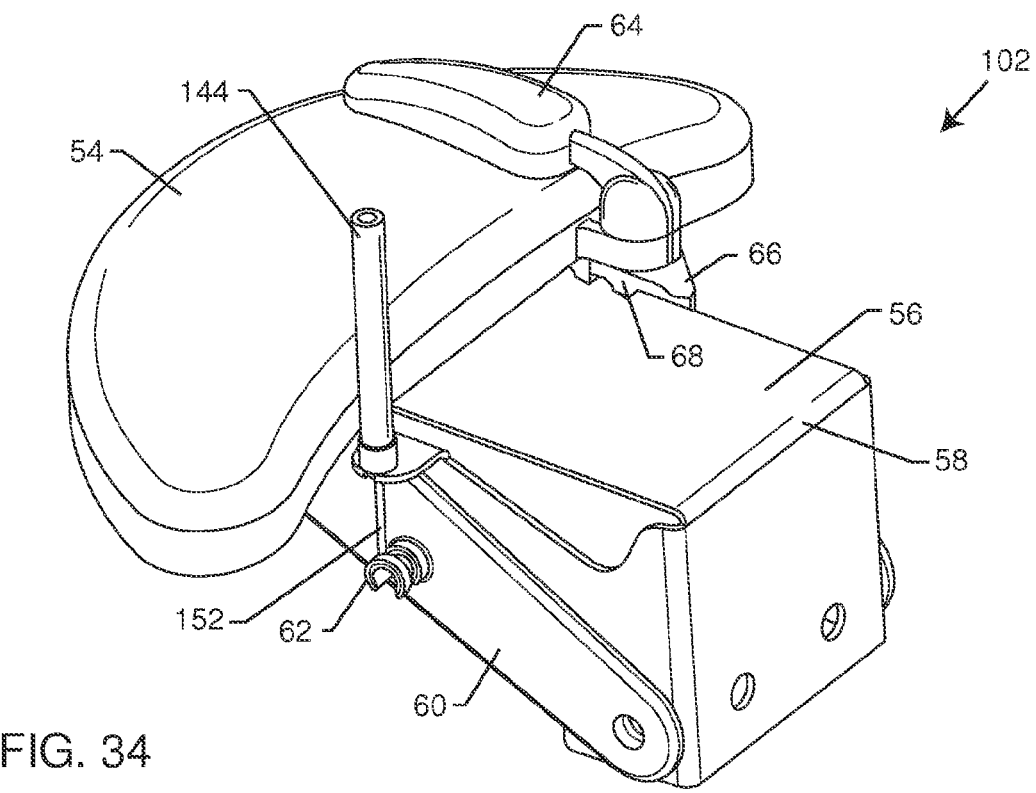
FIG. 34 is a rear perspective view of the structure of FIG. 33.
Figure 35:
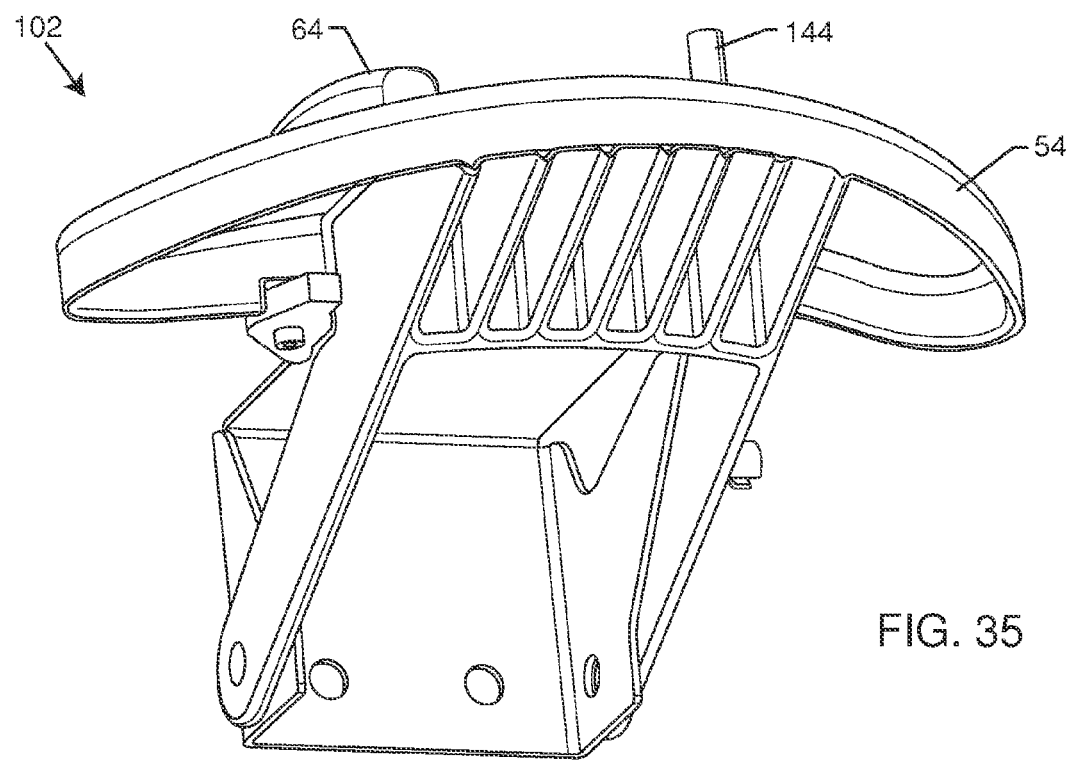
FIG. 35 is an upward perspective view of the structure of FIG. 33.
Figure 36:
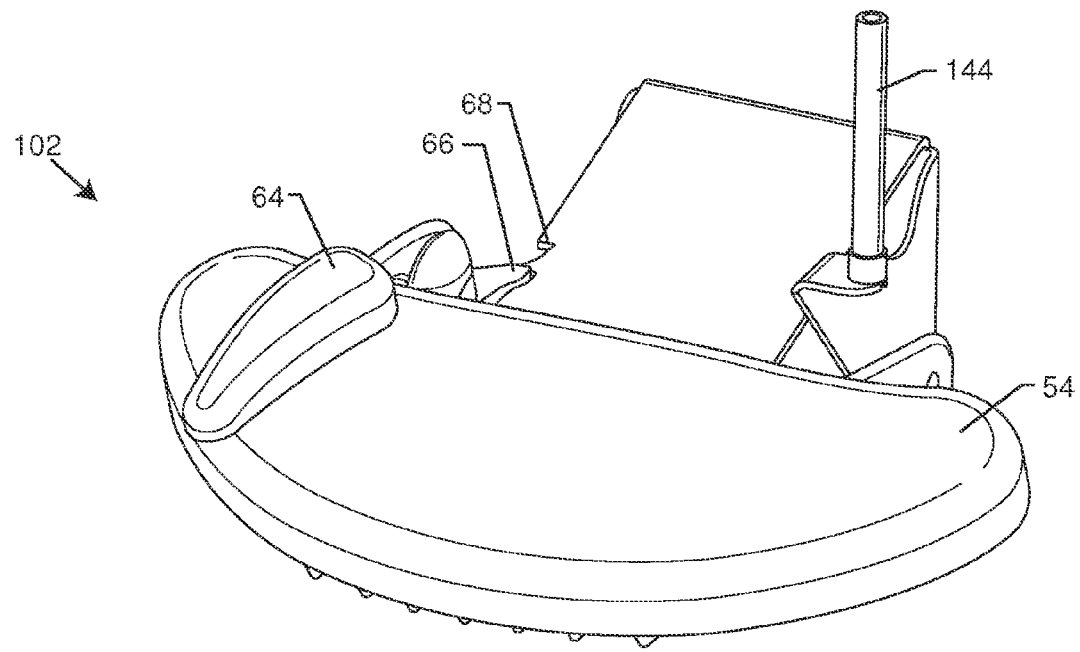
FIG. 36 is a perspective view of the structure of FIG. 33 now in the down position.
Figure 37:
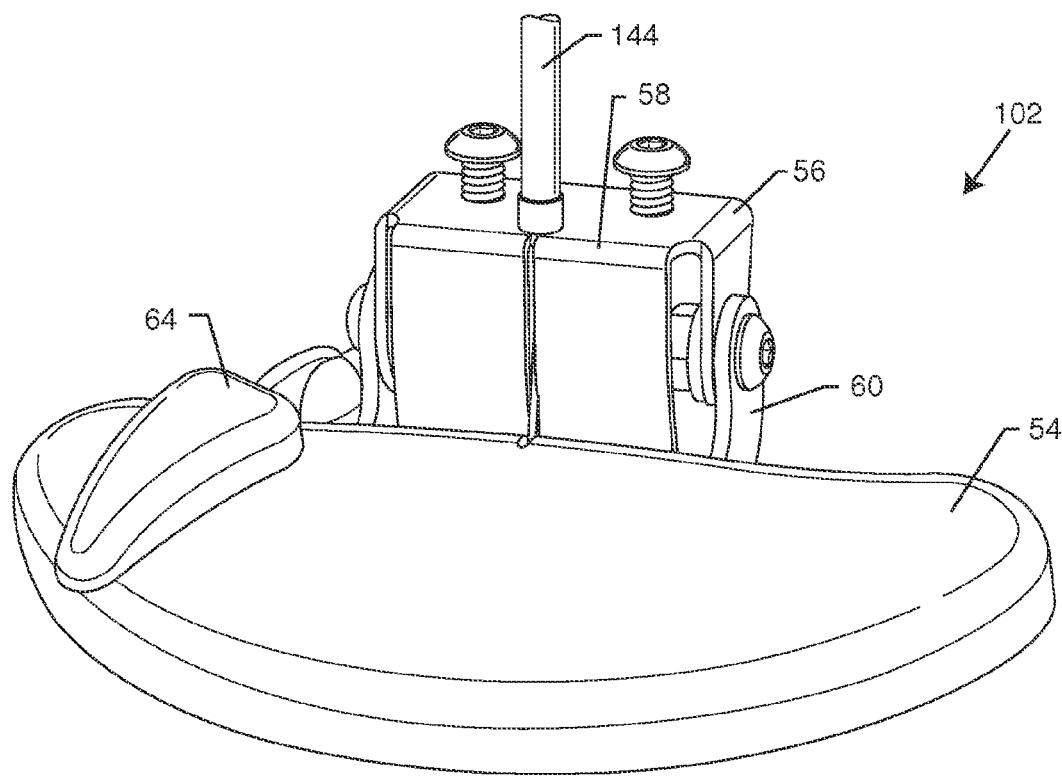
FIG. 37 is a perspective view of another exemplary foot pedal assembly of the present invention.
Figure 38:
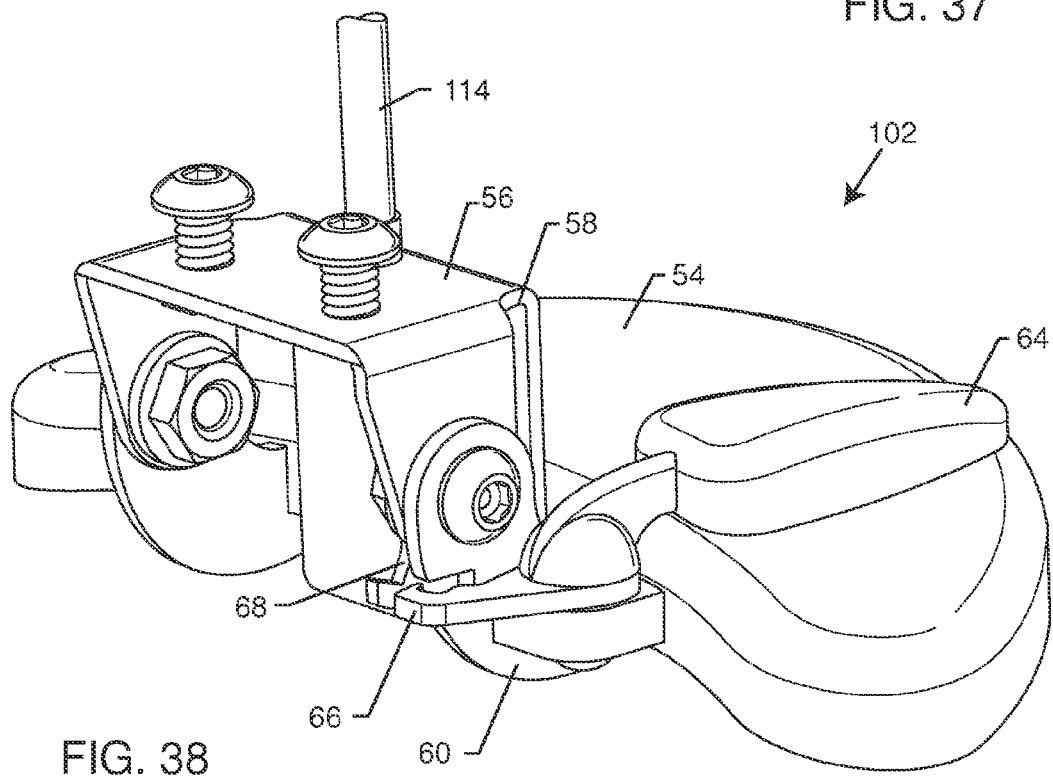
FIG. 38 is a rear perspective view of the structure of FIG. 37.
Figure 39:
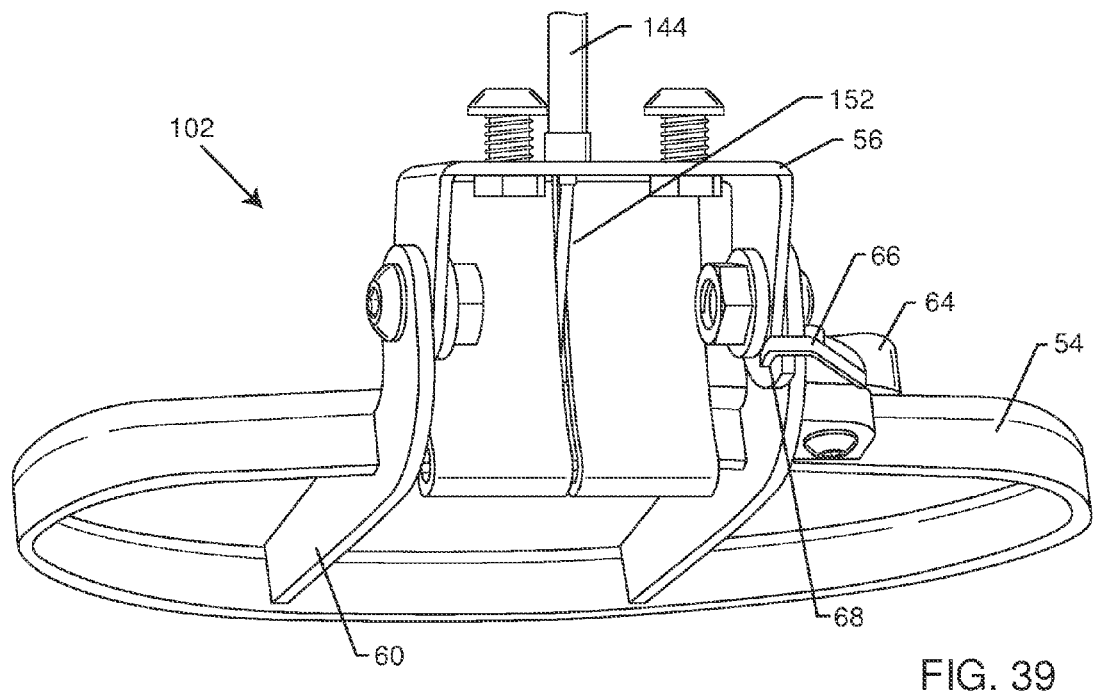
FIG. 39 is an rear perspective view of the structure of FIG. 37 now in the down position.
Figure 40:
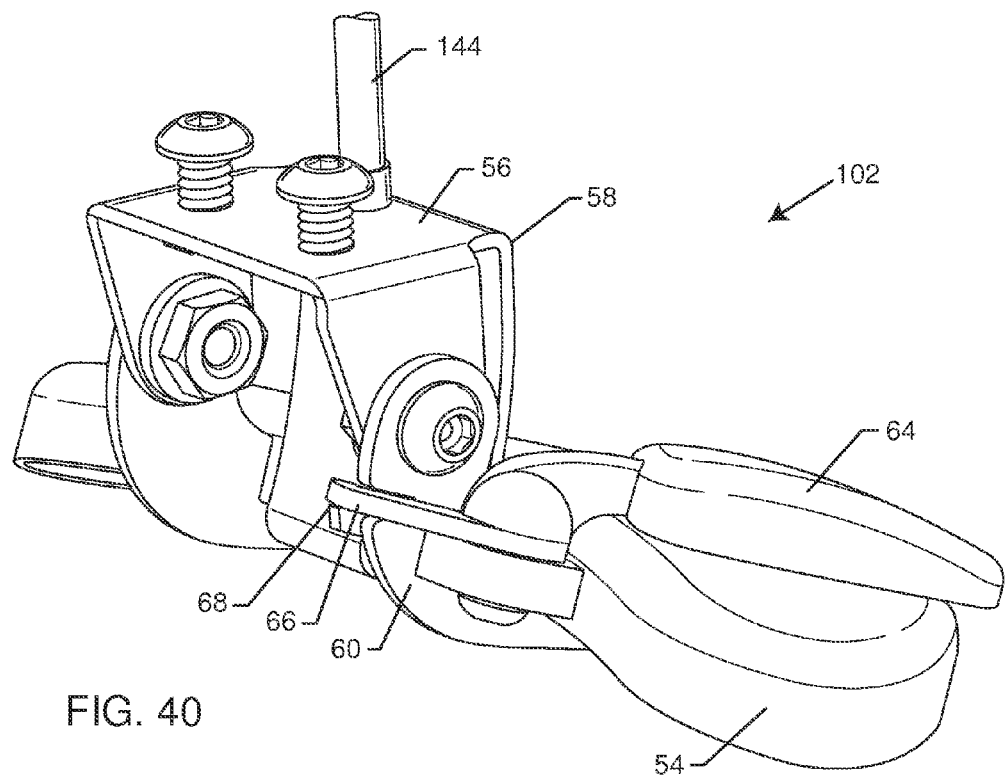
FIG. 40 is a perspective view of the structure of FIG. 37 similar to the view of FIG. 38 now in the down position.

Referring to FIG. 4, there are two valves 130a and 130b, where each valve is disposed within one of the respective cylindrically-shaped apertures 110 and frustoconically-shaped second ends 114. Each valve 130 is translatable along their respective axis of revolution 116. As best seen in FIGS. 6 and 7, each valve 130 has a proximal end 132 opposite a distal end 134. The valves 130 are simultaneously movable between a closed position as best seen in FIG. 32 and an open position as best seen in FIG. 31.

Figure 5:
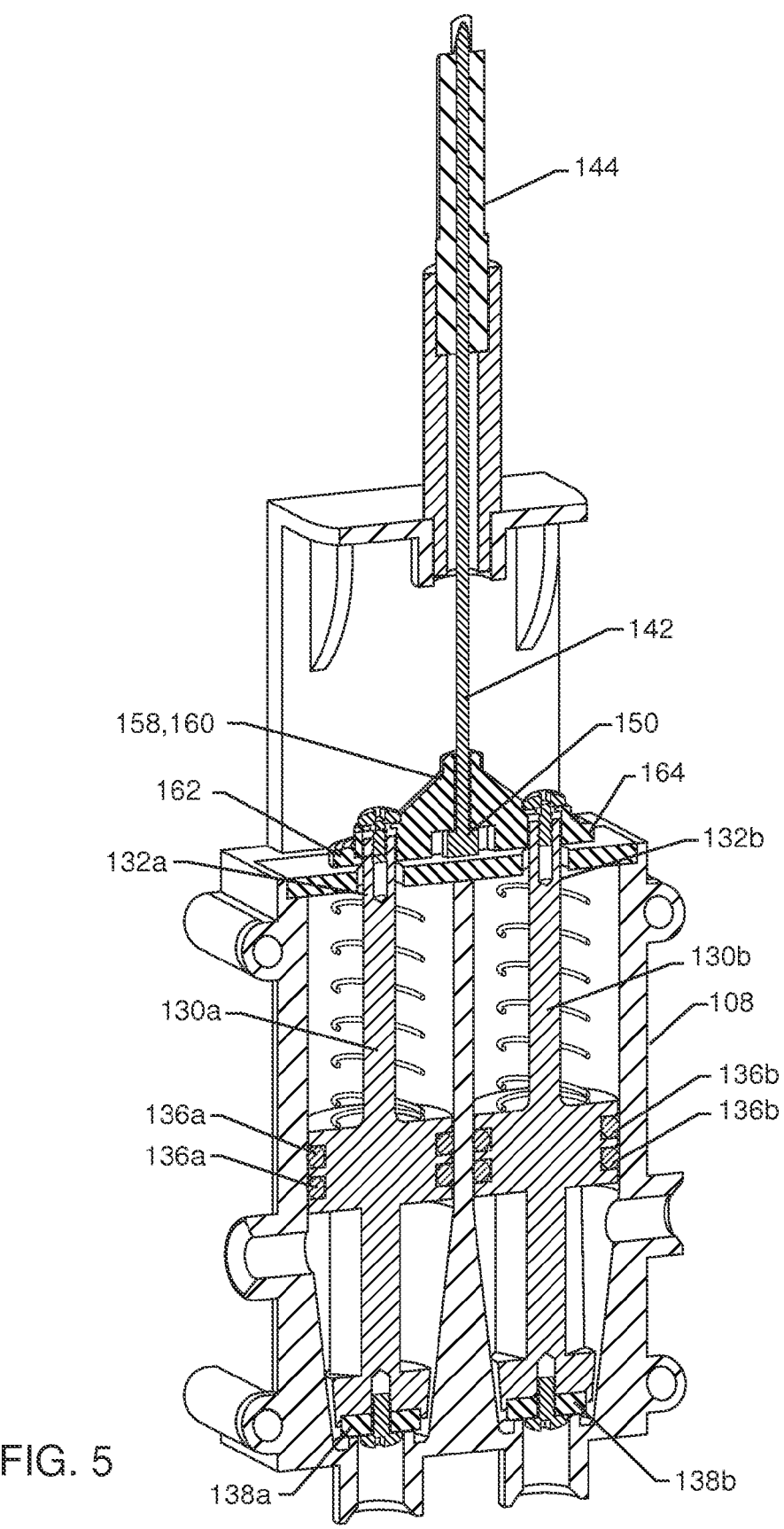
FIG. 5 is a sectional view of FIG. 3 taken along lines 5-5.

Referring now to FIGS. 6 and 7, there are a pair of first fluidic seals 136a and 136b. As seen in FIG. 5, each first fluidic seal 136 is disposed between its respective valve 130 and the cylindrically-shaped aperture 110. The pair of first fluidic seals 136 prevent a fluid from flowing thereby.

The pair of first fluidic seals 136 may comprise o-ring seals. Each first fluidic seal of the pair of first fluidic seals may comprise at least two o-rings disposed adjacently to one another as shown in FIGS. 6 and 7. The at least two o-rings increases the reliability of the fluid seal. However, it is understood that only one o-ring could be used, or even a plurality of o-rings used. It is also understood that the seal may be attached to the inside surface of the cylindrically-shaped aperture 110 instead of onto the valve 130. It is also understood that the seal may be shaped in other forms not being an o-ring. For example, a cylindrically-shaped elastomeric seal is possible. Furthermore, the elastomeric cylindrically-shaped seal could have integrated circumferential wipers that create the sealing action. As can be understood by those skilled in the art, many forms of seals are possible that are congruent with the teachings of this disclosure.

Referring now to FIGS. 6 and 7, there are a pair of second fluidic seals 138*a* and 138*b*. As seen in FIG. 5, each second fluidic seal 138 is disposed between its respective distal end 134 of the valve 130 and the narrow end 120 of the frustoconically-shaped second end 114. The valves 130 open and close as they simultaneously translate as best seen in FIGS. 31 and 32. The valves 130 opening and closing either opens or stops fluidic communication between the first fluid connection ports 122 and the interior portion 126 of the frustoconically-shaped second ends 114. Again, the seals 138 (and 136) may be made of many rubber, rubber-like or elastomeric materials. Furthermore, the pair of second fluidic seals 138 may be fastened onto their respective distal ends 134 of the pair of valves 130 with a fastener 139 or the pair of second fluidic seals 138 may be molded (overmolded) onto their respective distal ends 134 of the pair of valves 130.

As best seen in FIGS. 31 and 32, the frustoconically-shaped second ends 114 help in controlling the amount of water that is allowed to flow when the foot peddle 54 is activated. As the valves 130 retract, a gradual amount of flow area is created between the distal ends 134 of the valve 130 and the inside surface of the frustoconically-shaped second ends 114 such that the user can modulate the amount of water flowing there through with simply their foot. Previous designs were incapable of such precision and control of the water flow rate with the use of one's foot. As can be seen in FIGS. 6 and 7, the distal ends 134 of the valves 130 are also frustoconically-shaped such that they match the angle and shape of the frustoconically-shaped second ends 114 of the valve 130. In this way, a gradual control of the valve assembly 100 is achieved.

As best seen in FIG. 4, there are a pair of springs 140*a* and 140, where each spring 140 presses against their respective valves 130 biasing the valves 130 towards the closed position. The spring 140 may be a compression spring or any other equivalent structure that creates a preload.

FIGS. 33-36 show an exemplary foot pedal assembly 102 of the present invention. A pedal 54 is designed to remain in an upright position and the user simply steps upon the pedal 54 to open the valve assembly 100. As the pedal 54 moves downward, it pulls on the pull wire 142 of the sheathed guide wire 144 which then pulls or rotates the valve 130 inside the valve housing 108.

In this embodiment the pedal 54 remains upright because the bracket 56 is biased in an upright position. The bracket 56 acts as a support but also as a spring. The bracket 56 bends about corner 58. The bracket 56 is made of a flexible and resilient material such as spring steel, plastic such as reinforced nylon or the like. The pedal 54 is attached to a lever 60. Together the bracket 56 and lever 60 control the movement of the pedal 54. Also shown is a wire catch 62 that attaches to the distal end of the sheathed pull wire 32. The wire catch 62 is attached to the wire of the sheathed pull wire. The wire catch 62 can also be constructed as a slot, hole or aperture that the end of the pull wire second end 152 can connect to.

Another novel feature of the present invention is the addition of a hold down feature. A switch 64 is positioned directly above the pedal 54. When a user steps upon the pedal 54, they may also then move their foot to the side activating the rotatable/pivotable switch 64 to keep the pedal 54 down without having to keep one's foot constantly upon the pedal 54. As can be seen in these views, the switch 64 includes a protrusion 66 that engages into a notch 68 formed into the bracket 56. Several notches 68 may be used to provide numerous levels of on.

FIGS. 37-40 show another embodiment of a foot pedal assembly 102. The function of FIGS. 37-40 is similar to FIGS. 33-36 while the structure is different. The sheathed guide wire 144 is designed to come down in the middle of the foot pedal assembly 102. The bracket 56 still flexes but is shaped differently. The foot pedal assembly of FIGS. 37-40 is designed to be attached to the underside of the floor of the cabinet whereas the embodiment in FIGS. 33-36 is designed to be attached to the vertical kickboard at the base of the cabinet. It will be understood by those skilled in the art that a spring or bias mechanism could also be used to bias the pedal 54 in an upright manner.

Figure 41:
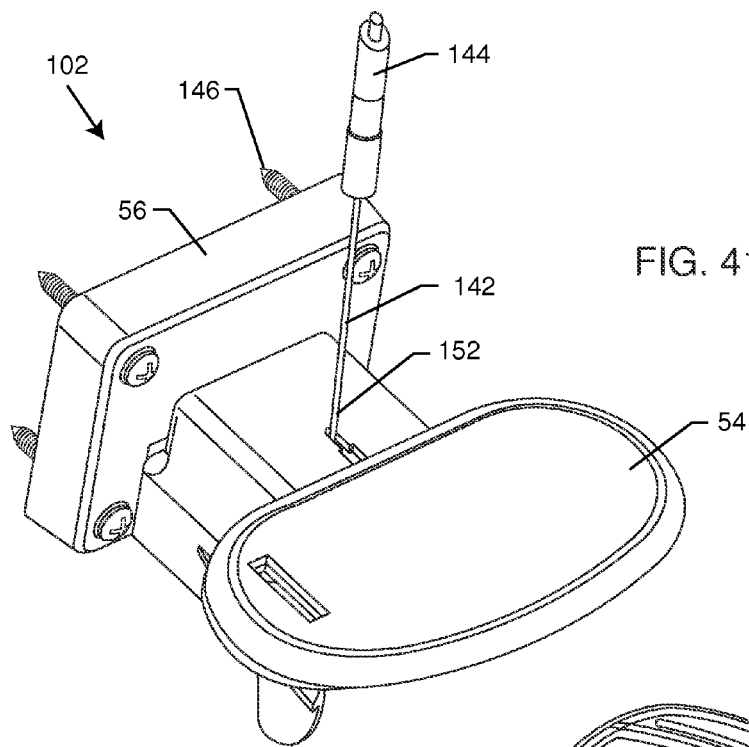
FIG. 41 is a perspective view of another exemplary foot peddle assembly.
Figure 42:
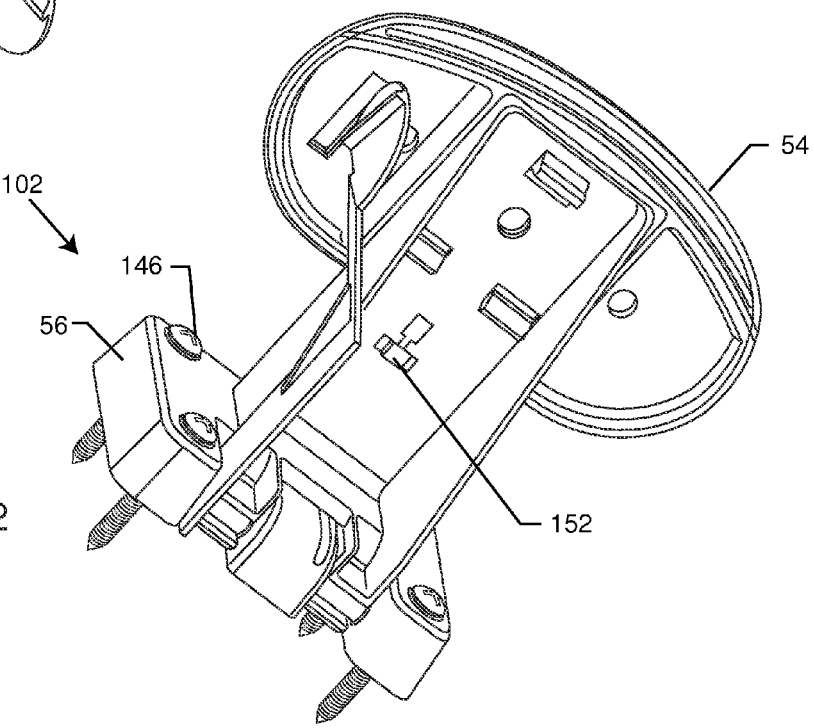
FIG. 42 is a rear perspective view of the structure of FIG. 41.

FIGS. 41 and 42 is yet another embodiment of a foot peddle assembly 102 which is slightly different than the other embodiments. Here, the peddle 54 is pivotably coupled to the bracket 56. The bracket 56 is designed to attach to a vertical surface such as the kickboard at the base of the cabinet 10. As can be seen, fasteners 146 can be used to screw into the wood of the kickboard.

Figure 43:
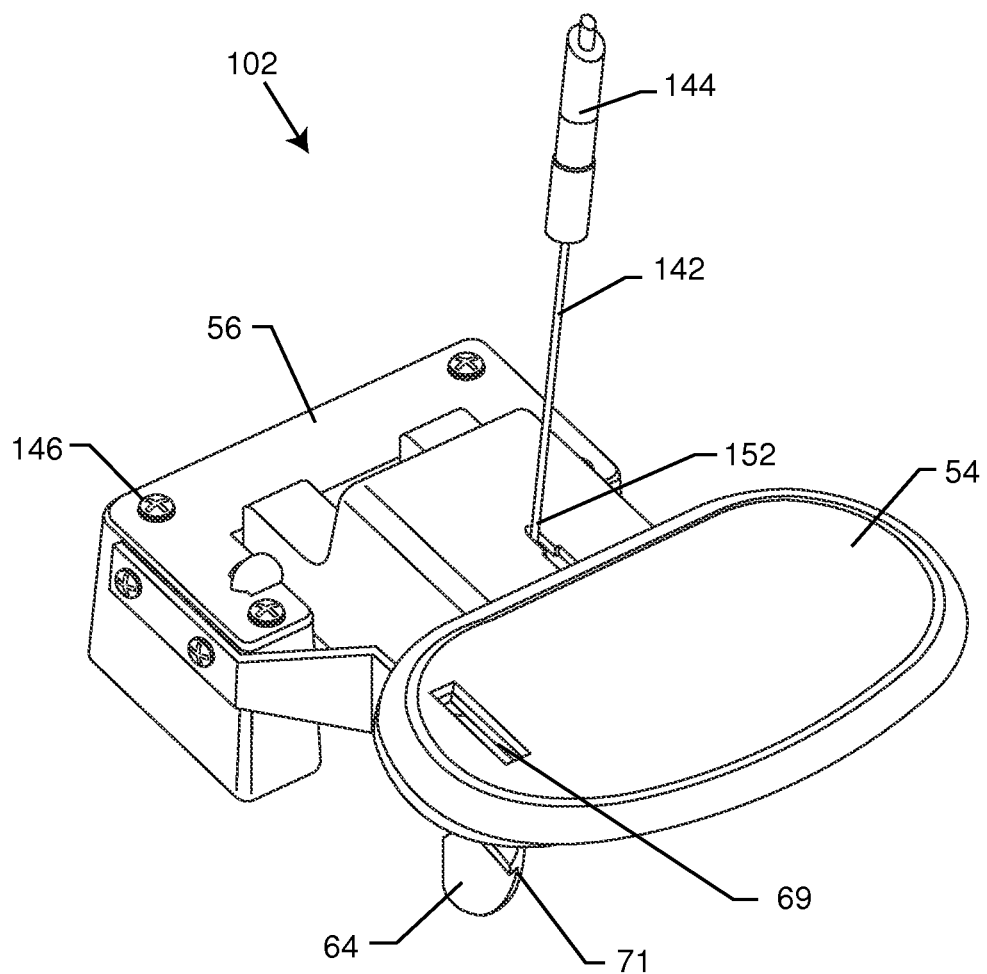
FIG. 43 is a perspective view of another exemplary foot peddle assembly now mounted to the floor.

FIG. 43 is yet another embodiment of a foot peddle assembly 102. Here, the bracket 56 is designed to mount to the topside of the floor 148.

As shown herein, there are many embodiments of a foot pedal assembly 102 that includes a foot peddle bracket 56 attachable to a structural support, where the structural support for the foot peddle bracket can be a wall, a cabinet or a floor. Accordingly, one skilled in the art could modify any of the disclosed concepts to create new versions that operated in different ways but achieved the same goals and functionality. Also, the foot activated hold-down switch 64 may be pivotably or flexurally attached to the foot pedal bracket 56 as shown in FIGS. 42 and 43. Here, the foot activated hold-down switch 64 penetrates through a hole 69 in the foot peddle 54. The extension 71 can then capture the top surface of the foot peddle 54 when the foot peddle 54 is depressed. The foot peddle 54 will stay down until the user pushes the switch 64 to the side and releasing the foot peddle 54. Referring back to FIG. 40, the foot activated hold-down switch 64 may include a protrusion 66 configured to engage a notch 68 located on the foot peddle bracket 56 as shown in FIG. 40. In this case, the user would push the foot peddle 54 downward and then then push the switch 64 to the side to force the protrusion 66 to engage the notch 68. A spring can be biased against the switch 64 to either force it to remain closed or force it to remain open, depending on the user's preference. As can now be seen, a multitude of hold-down switches can be devised and used with the disclosed structures.

Referring back to FIG. 5, a pull wire 142 is connected at a pull wire first end 150 to the proximal end 132 of the valve 130 and connected at a pull wire second end 152 to the foot pedal assembly 102. Movement of the foot pedal 54 to the down position by a user moves the valves 130 to the open position. The pull wire 142 may comprise a sheathing 144 that allows the pull wire 142 to easily translate and move easily within.

Figure 10:
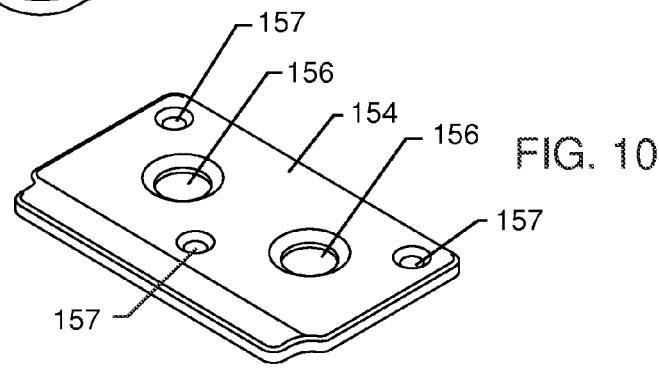
FIG. 10 is a perspective view of an exemplary cap.
Figure 11:
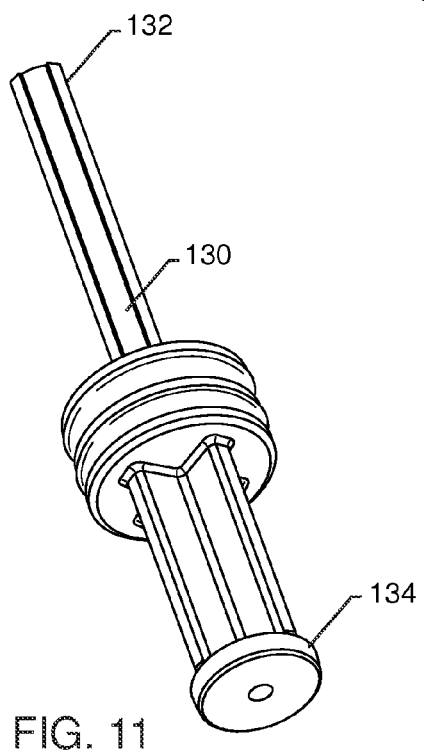
FIG. 11 is a perspective view of an exemplary valve.
Figure 12:
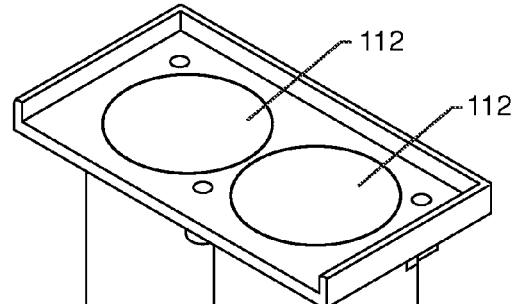
FIG. 12 is a perspective view of an exemplary valve housing.

Referring now to FIG. 10, other exemplary embodiments may include a cap 154 attached to the valve housing 108 disposed at the open first ends 112. The cap 154 includes a pair of holes 156 which are aligned with the proximal ends 132 of the two valves 130. The cap 156 can be adhered, pressure fit, bonded or fastened to the valve housing 108 through fastener holes 157. As best seen in FIG. 4, the pair of springs 140 are captured between the cap 154 and their respective valves 130.

Figure 9:
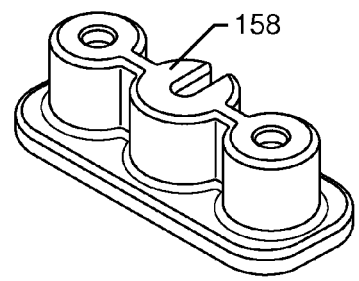
FIG. 9 is a perspective view of an exemplary pull wire connector.
Figure 13:
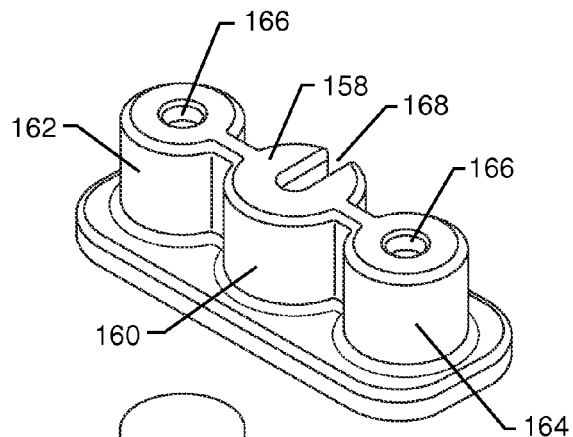
FIG. 13 is a perspective view of an exemplary cap.
Figure 14:
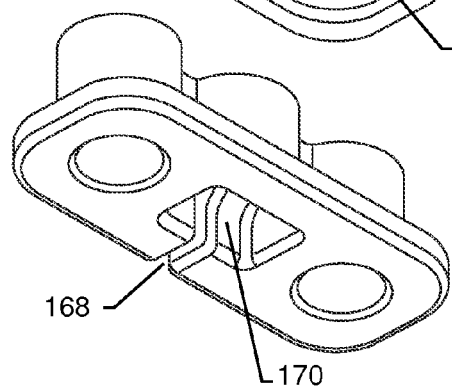
FIG. 14 is another perspective view of the structure of FIG. 13.
Figure 15:
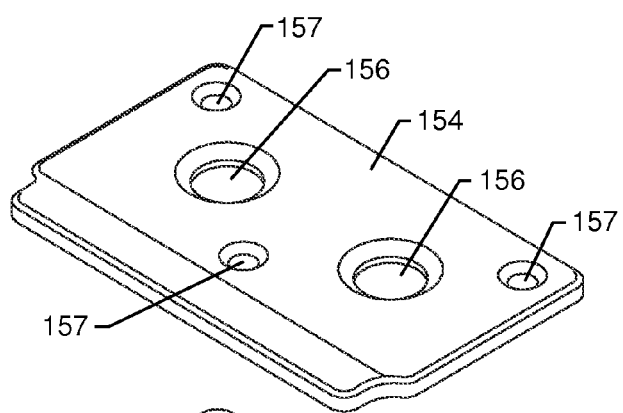
FIG. 15 is a perspective view of an exemplary cap.
Figure 16:
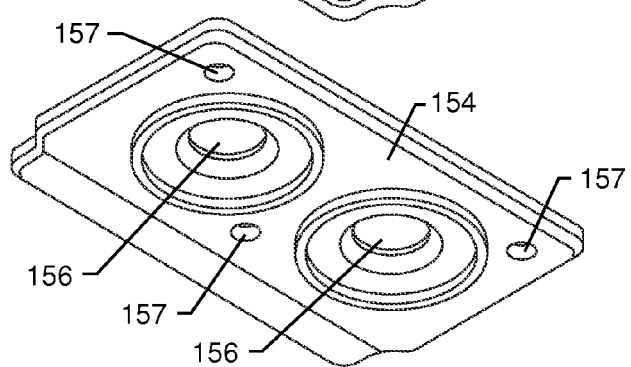
FIG. 16 is another perspective view of the structure of FIG. 15.
Figure 21:
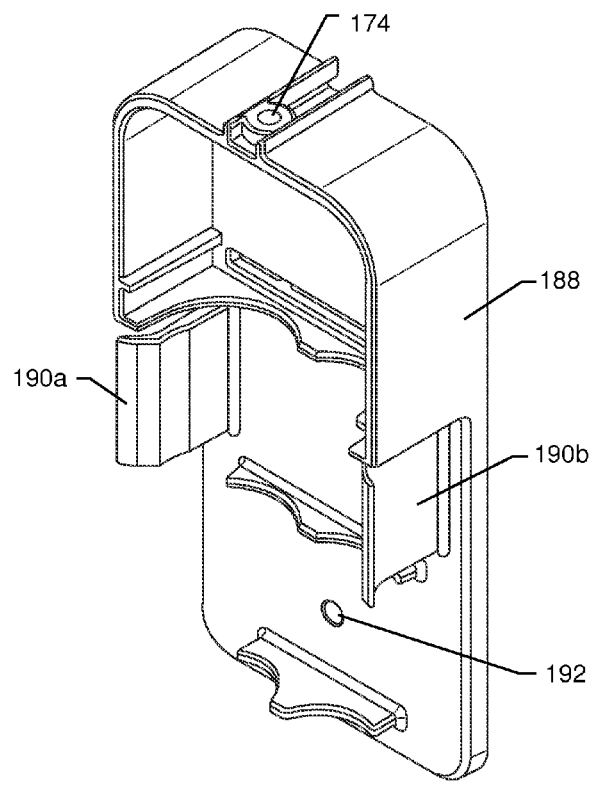
FIG. 21 is a perspective view of the structure of FIG. 17.

As seen in FIG. 3, a pull wire connector 158 may be attached at a middle portion 160 to the pull wire first end 150. The pull wire connector 158 has a left portion 162 opposite a right portion 164 about the middle portion 160. As shown in FIG. 5, the left portion 162 is connected to the proximal end 132a of one of the two valves 130a, and the right portion 164 is connected to the proximal end 132b of the other of the two valves 130b. Another embodiment of the pull wire connector 158 is shown in FIGS. 9, 13 and 14. Here, there are holes 166 for fasteners to extend there through. A slot 168 allows the pull wire 142 to be inserted such that the pull wire first end 150 can be captured in the recess 170. The pull wire first end 150 can include an enlarged end that is either crimped or fastened to the pull wire 142. This end can also be described as a ferrule, which is an enlarged ring or cap, typically a metal one, that strengthens the end of the wire and prevents it from splitting, fraying or wearing. Then the enlarged end is captured into the recess 170 such that when the pull wire 142 is pulled it will move the pull wire connector 158 and also the valves 130 which are attached as well.

As best seen in FIGS. 3 and 4, a bracket 172 may be attached to the valve housing 108. The bracket includes a pull wire alignment aperture 174 disposed above the middle portion 160 of the pull wire connector 158. The pull wire alignment aperture 174 can be a slit as shown here or a hole or other various sized aperture. Then, a pull wire tensioner 176 may be disposed within the pull wire alignment aperture 174 of the bracket 172. The pull wire 142 is captured and disposed through the pull wire tensioner 176, where the pull wire tensioner 176 is adjustably positioned in a translational direction which can move closer to and further from the pull wire connector 158 thereby adjusting the tension of the pull wire 142.

Another embodiment of a pull wire tensioner 176 is shown in FIG. 23. Here, the pull wire tensioner 176 has an enlarged head 178 that can be grasped with a threaded end 180. A slot 182 allows the pull wire 142 to be placed within.

Figure 22:
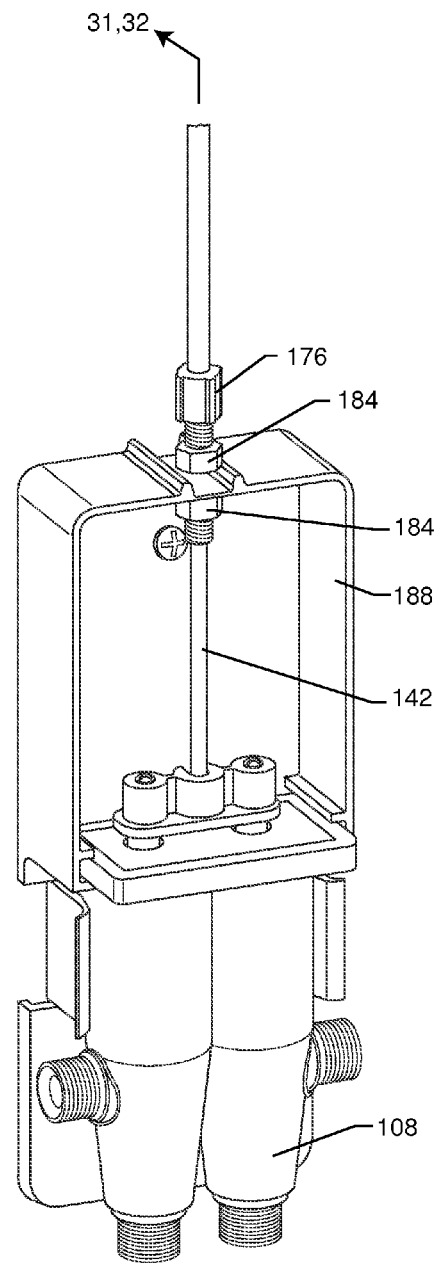
FIG. 22 is a perspective view of another exemplary embodiment of a valve assembly using the back plate of FIG. 17.
Figure 26:
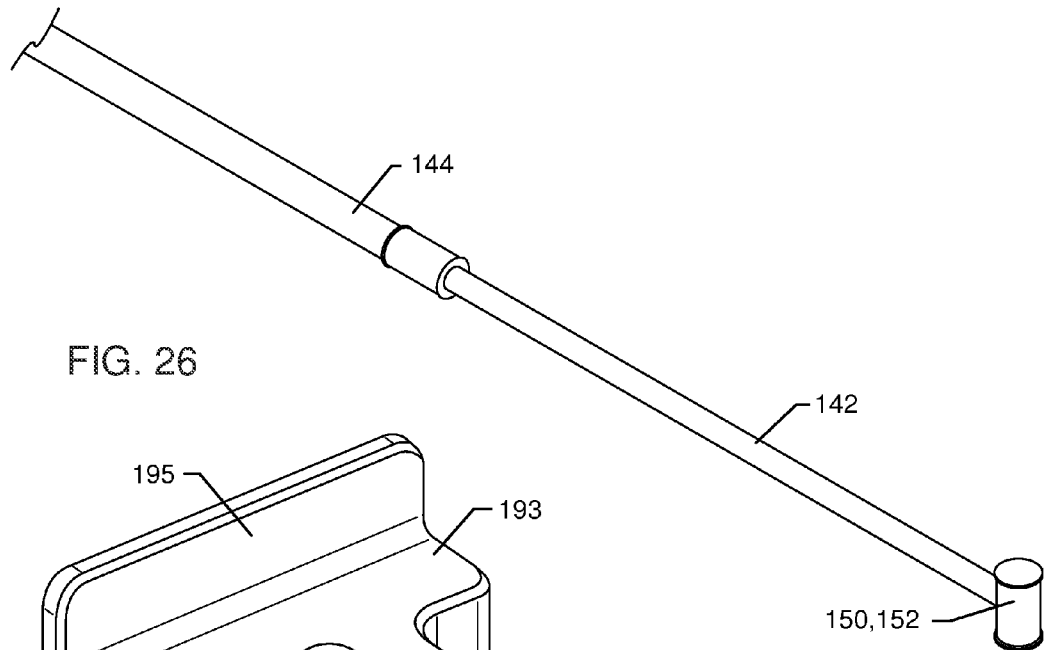
FIG. 26 is a perspective view of an exemplary pull wire with sheathing.

FIGS. 24 and 25 show a specialized nut 184 that is configured to thread onto the pull wire tensioner 176. The nut 184 has a slot 186 such that it can be placed over the pull wire 142 and installed onto the pull wire tensioner 176. The assembly of the pull wire tensioner 176 with two oppositely disposed nuts 184 is best seen in FIG. 22. By adjusting the nuts 184 in relation to the pull wire tensioner 176, the tension or slack in the pull wire 142 can be adjusted and optimized.

As shown in FIGS. 17-22, a back plate 188 may capture the valve housing 108 through the use of at least one flexure, or two flexures 190a and 190b as shown. The back plate 188 is designed to accept the valve housing 108 such that it locks into place by allowing the flexures 190 to grip around the curved surface of the valve housing 108. In this way, a user can install all the plumbing lines to the valve housing and then simply press the valve housing onto the back plate 188 to hold it in place. This ease of installment allows for an easier installation and reduces labor time and complications. The back plate 188 may also include fastening holes 192 that allow it to be fastened to the back wall of a cabinet. The back plate 188 may include a pull wire alignment aperture 174 disposed above the middle portion 160 of the pull wire connector 158. The pull wire alignment aperture 174 can be a hole as shown here or a slit, slot or other various sized aperture.

Figure 27:
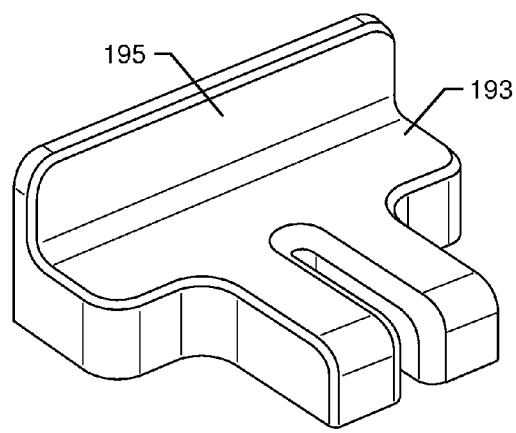
Figure 28:
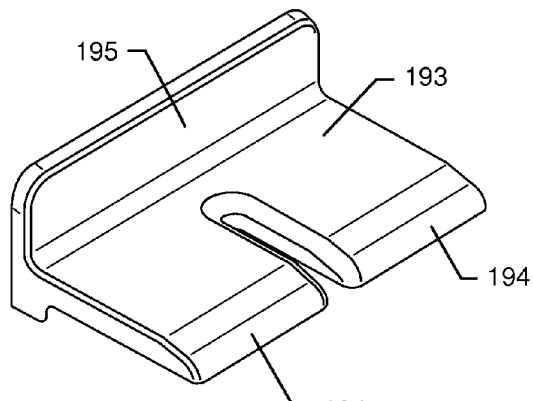
Figure 29:
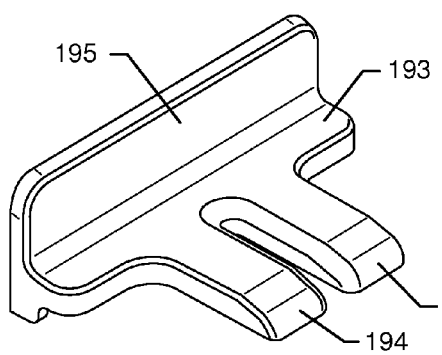
Figure 30:
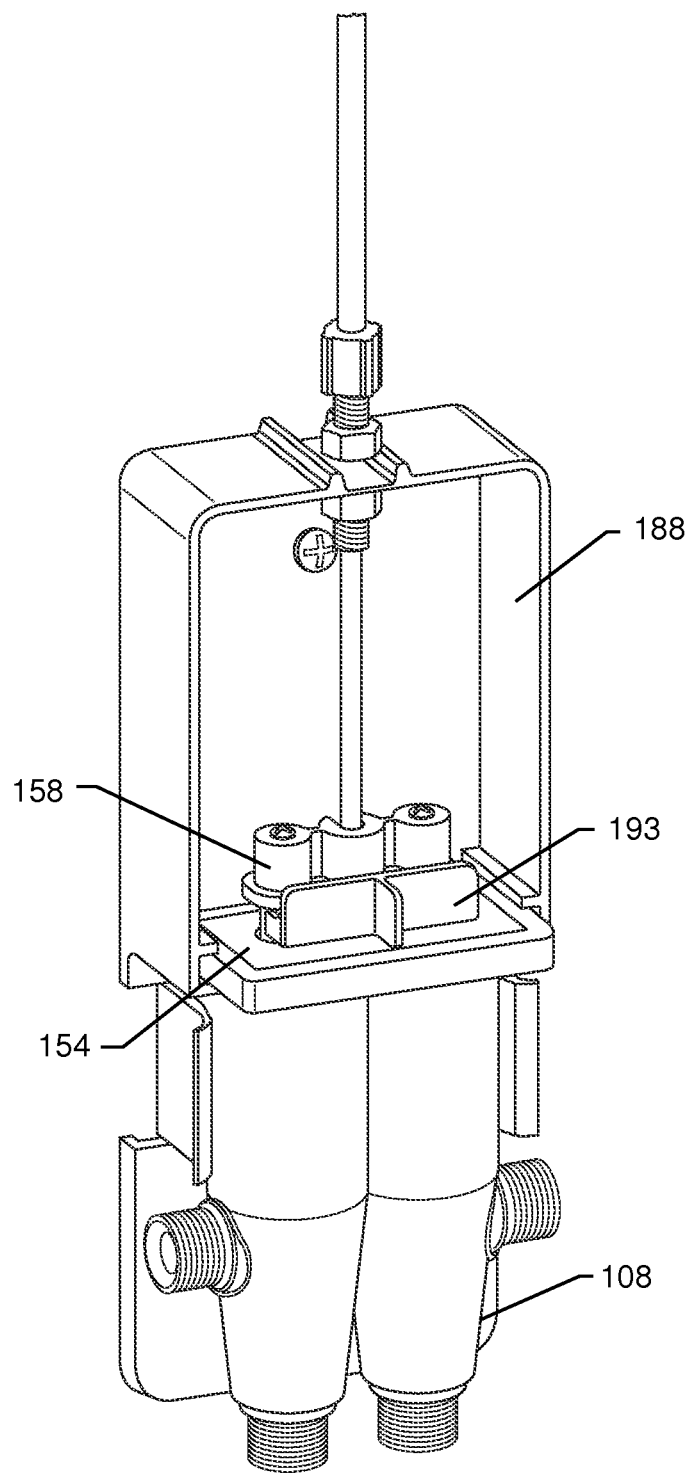
FIG. 30 is a view similar to FIG. 22 now with the lock-on attached.

The springs 140 bias the valves 130 to be in the closed position. If for some reason the pull wire 142 is broken or cut, the valves assembly 100 will be closed. This means that at the faucet water will not come out whether or not the faucets are turned and whether or not the foot peddle 54 is depressed. As shown in the differing embodiments of FIGS. 27-29, a lock-on 193 may be included. The lock-on 193 is configured to be placed by the user between the cap 154 and the pull wire connector 158 as shown in FIG. 30 which then forces the two valves 130 into the open position. The faucet may then be used in a traditional manner controlling the flow of water. The lock-on 193 can be inserted by pulling up on the pull wire connector 158. Alternatively, the lock-on 193 may include an acutely-angled insert end 194 that is configured to be wedged between the cap 154 and the valve housing 130 by the user such that the user can simply wedge the lock-on 193 into place. The lock-on 193 also includes a grip 195 such that it can be removed.

Figure 45:
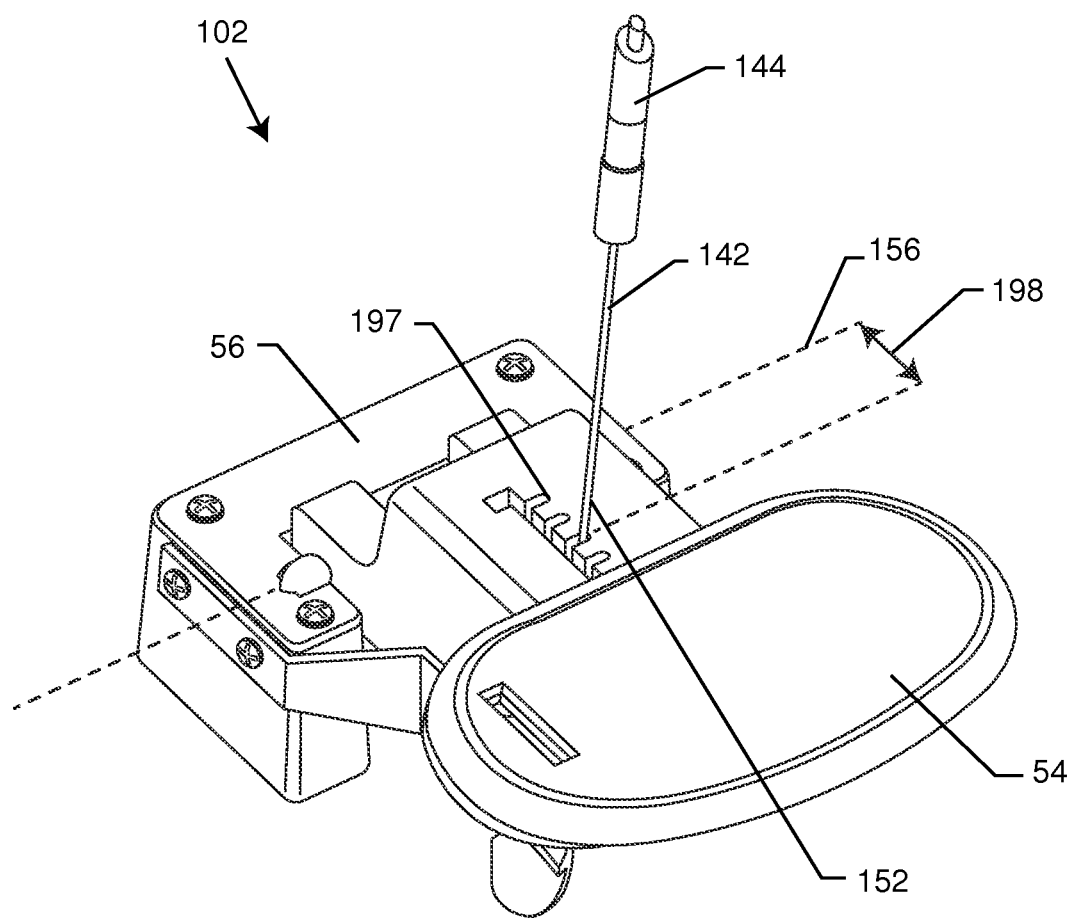
FIG. 45 is a perspective view of another exemplary foot peddle assembly with adjustable torque.

When stepping upon the foot peddle 54, it may require a lot of pressure to then open the valves 130. There is a way to use a mechanical advantage to reduce the required foot pressure. Referring now to FIG. 45, the foot peddle 54 may be pivotably connected to the foot peddle bracket 56 about a pivot axis 156. The foot peddle 54 may include a plurality of pull wire connections 197 for the pull wire second end 152 to connect to. As shown, the plurality of pull wire connections 197 are at a varying distance 198 from the pivot axis. When the distance 198 is smaller, this means more pressure is needed to be applied to open the valves. When the distance 198 is larger, this means less pressure is needed to be applied to open the valves. The plurality of pull wire connections 197 can be molded into the various parts of the foot peddle 54 or installed as a separate component that attaches to the foot peddle 54.

Figure 44:
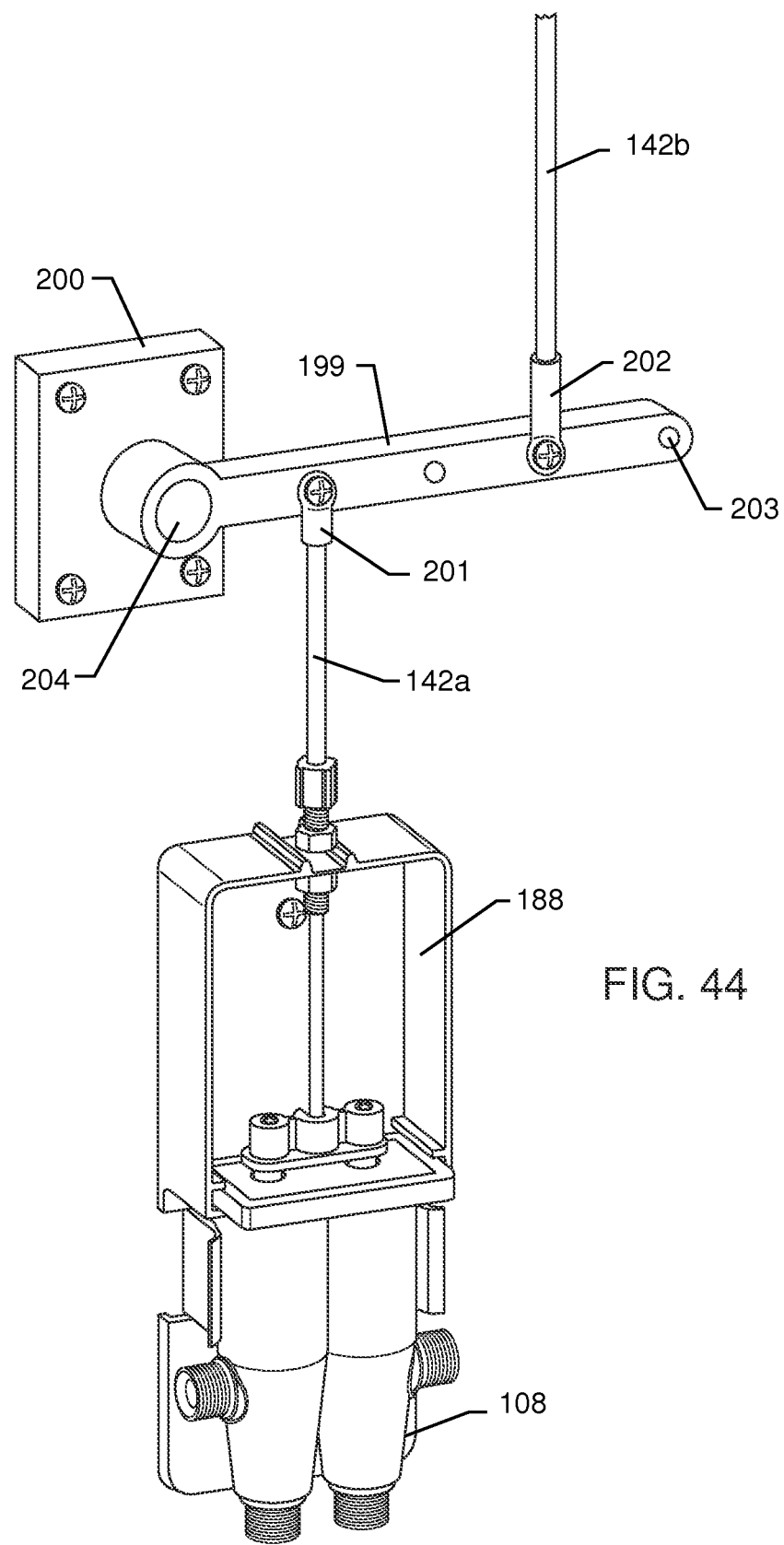
FIG. 44 is a perspective view of an exemplary torque increasing lever.

Another solution for reducing pressure is shown in FIG. 44. A torque increasing lever 199 may be included, where the torque increasing lever 199 is pivotably attached by a bracket 200 to a structural support or to a second structural support. The pull wire 142 may comprise a first section 142a which is separate from a second section 142b, where the first section 142a comprises the pull wire first end 150 opposite a first lever connection 201. The second section 142b comprises the pull wire second end 152 (not shown in this view) opposite a second lever connection 202. The first and second lever connections are pivotably coupled to the torque increasing lever 199 at a distance apart from one another along the holes 203. In this case, the pull wire first section 142a is closer to the pivot 204 than is the pull wire second section 142b. This means that the force exerted by the pull wire second section 142b is increased along the pull wire first section 142a. In this way, by adjusting the locations of the pull wire 142, increased torque can be achieved which results in a decreased force needed to be exerted at the foot peddle 54.

Figure 46:
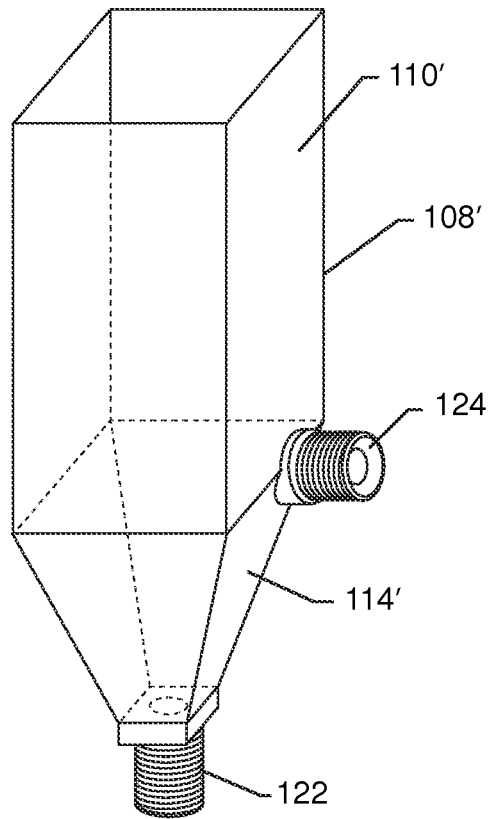
FIG. 46 is a perspective view of a simplified representation of a new embodiment of a valve housing.
Figure 47:
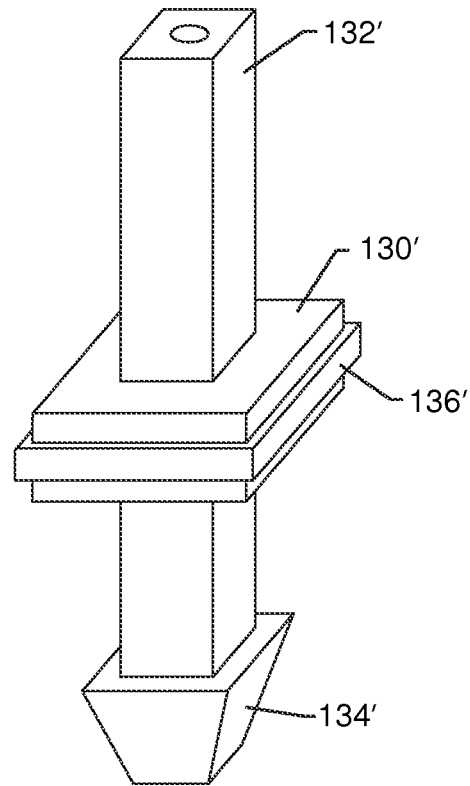
FIG. 47 is a perspective view of a simplified representation of a new embodiment of a valve that is designed to fit within the valve housing of FIG. 46.

In an alternative embodiment shown in FIGS. 46 and 47, the generally cylindrical nature of the valve 130' and corresponding valve housing 108' could be shaped into a triangle, square, pentagon, rectangle or many faceted surface, such that it still forms a workable valve assembly 100 as taught herein. For example, if one was to modify the shown structures into a square shape as shown herein, the cylindrically-shaped apertures 110' could be formed into a square-shape that is extended a certain distance. Then the square-shaped aperture 110' would blend into a four-sided pyramid structure 114' that would mimic the functionality of the present invention. The valve 130' could be similarly be shaped to fit within the square-shaped aperture. The seal 136' can then be square-shaped as well. Then, as the valve 130' is moved, it would still create a gradual increase in flow area such that gradual and fine control of the amount of water is still possible by a user foot against the foot peddle 54 which keeps in line with the teachings disclosed herein. Furthermore, the valve's distal end 134' would also be pyramid-shaped to match the inside surface of the pyramid-shaped structure 114'. It is understood that these principals could be applied to a wide variety of multi-faceted shapes that incorporate the teachings herein.

Figure 48:
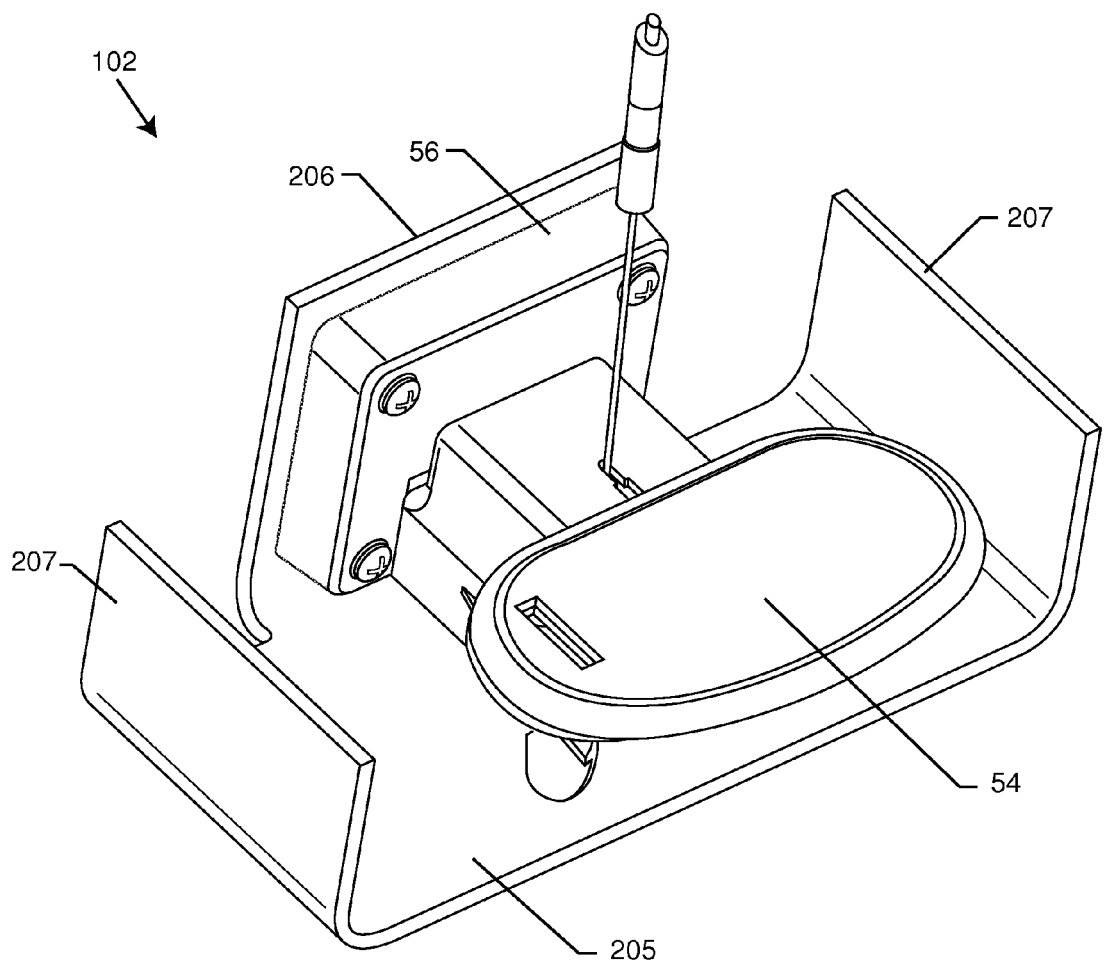
FIG. 48 is a perspective view similar to FIG. 41 now with a foot stand for placement upon the floor.

FIG. 48 is another embodiment of a foot peddle assembly 102. This embodiment uses the structure shown in FIG. 41, but now has a free-standing foot stand 205. As shown herein, the foot stand 205 can be made from a single piece of cut metal that is then bent into the shape as shown herein. For example, the foot stand has an upright back 206 that allows the bracket 56 to attach to. The foot stand 205 also has a left-side and right-side kick barrier 207 that is used to prevent unintentional activation of the foot peddle assembly. This kick barrier 207 also prevents damage to the mechanisms of the foot peddle. The foot stand can be a free-standing unit that is not bolted or attached to the floor. Alternatively, the foot peddle can be temporarily attached to the floor using hook-and-loop fasteners, adhesives, fasteners or the like.

Figure 49:
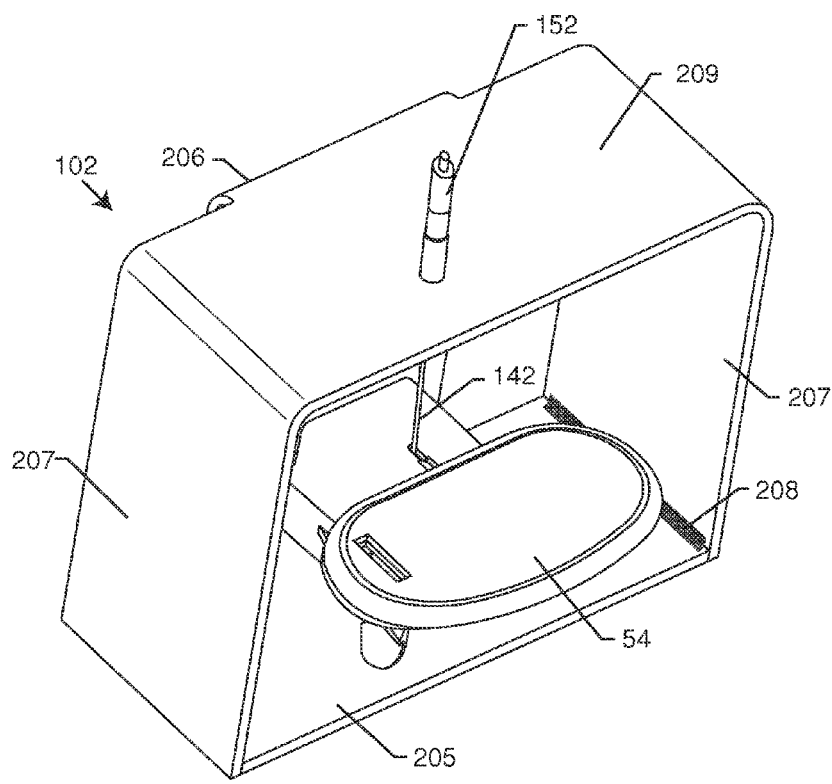
FIG. 49 is a perspective view similar to FIG. 48 now with a different embodiment of a foot stand that is structurally more rigid.
Figure 50:
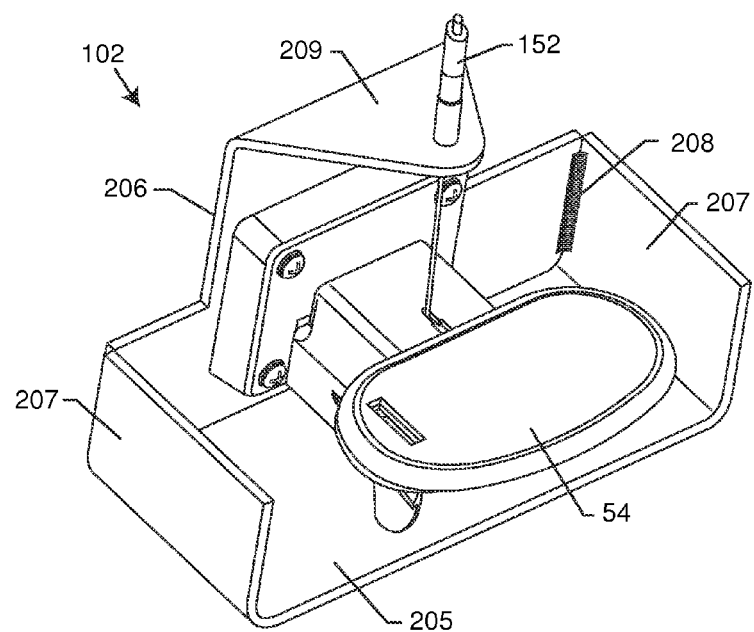
FIG. 50 is a perspective view similar to FIG. 48 now showing a different embodiment of a foot stand.
Figure 51:
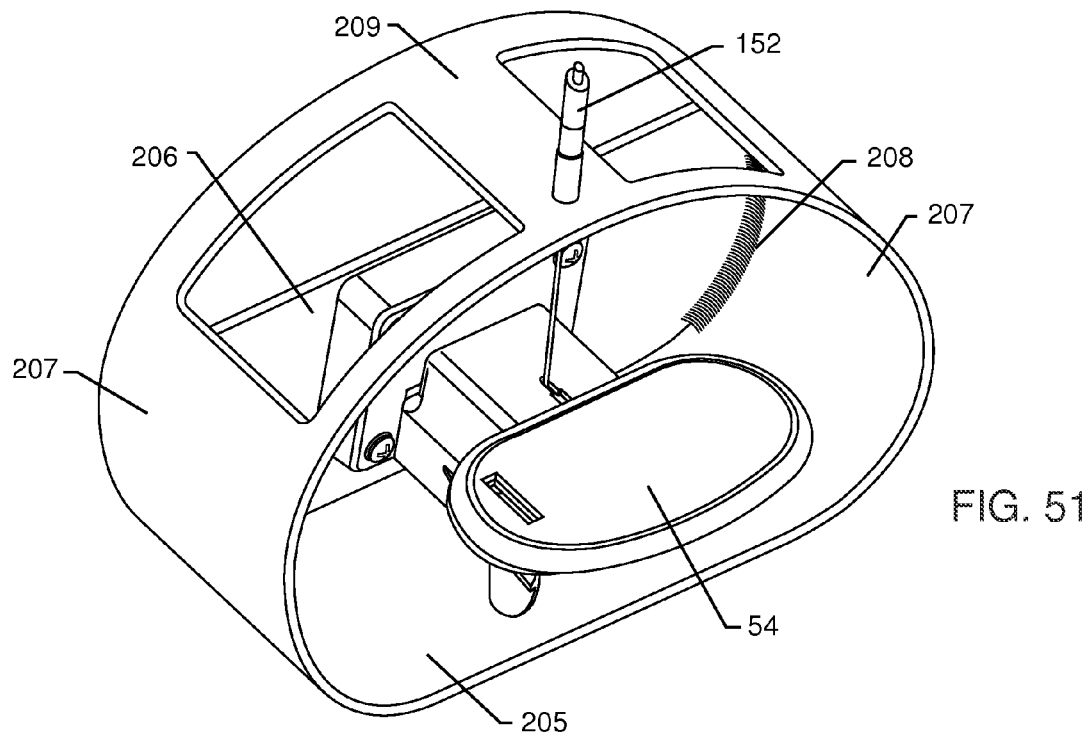
FIG. 51 is a perspective view similar to FIG. 48 now showing a different embodiment of a foot stand that has a gradual curve.
Figure 52:
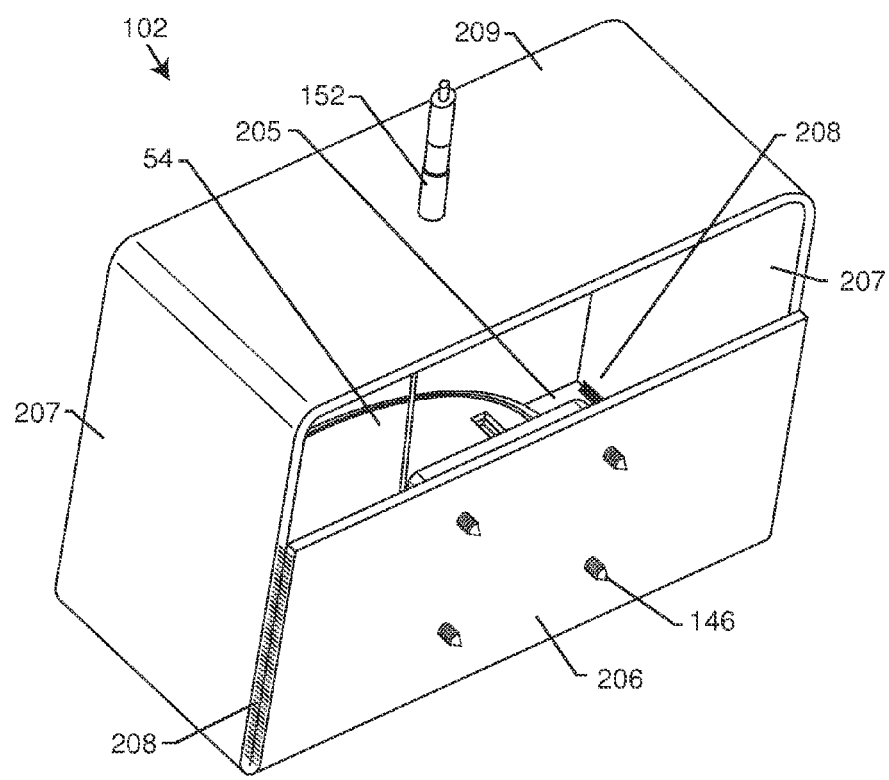
FIG. 52 is a rear perspective view similar to the structure of FIG. 48 now showing a different embodiment of a foot stand.

FIG. 49 shows yet another embodiment of a foot peddle assembly 102. This view is similar to FIG. 48, but now the foot stand 205 fully encloses the foot peddle 54 and the bracket 56 (hidden as shown). As compared to FIG. 48, this embodiment is structurally more rigid and solid. The foot stand 205 can be made from a single sheet of metal that is cut and then bent into shape. The upright back 206 allows the bracket 56 an attachment point. Now the metal is formed to have a ceiling 209 which facilitates a location for the second end 152 of the pull wire 142 to connect to. A weld 208 can be used to fuse and connect the different parts of the metal sheet. This increases the rigidity of the kick barrier sides 207 and also the upright back 206. As compared to FIG. 48, FIG. 49 can use a thinner gauge metal sheet and still result in a stiffer structure. FIGS. 50, 51 and 52 are yet more embodiments of a foot peddle assembly 102. FIG. 52 is a perspective view from the rear such that its structure can be more easily seen and understood. Again, all of these embodiments could be made from a metal sheet which is then bent and welded into position. Alternatively, the foot peddle could be made from plastics, wood, composites and various other materials.

Although several embodiments have been described in detail for purposes of illustration, various modifications may be made to each without departing from the scope and spirit of the invention. Accordingly, the invention is not to be limited, except as by the appended claims.

NUMERALS 10 cabinet
12 sink
54 peddle
56 bracket, peddle
58 corner
60 lever
62 wire catch
64 hold down switch
66 protrusion
68 notch
69 hole, foot peddle
71 extension, foot activated hold-down switch
100 valve assembly
102 foot peddle assembly
104 inlet water lines
106 outlet water lines
108 valve housing
110 cylindrically-shaped apertures
112 open first end
114 frustoconically-shaped second end
116 axis of revolution
118 wide end
120 narrow end
122 first fluid connection port
124 second fluid connection port
126 interior portion
128 fastening holes
130 valve
132 proximal end, valve
134 distal end, valve
136 first fluidic seals
138 second fluidic seals
139 fastener, second fluidic seals
140 pair of springs
142 pull wire
144 sheath, pull wire
146 fasteners
148 floor
150 pull wire first end
152 pull wire second end
154 cap
156 holes, cap
157 fastener holes, cap
158 pull wire connector
160 middle portion, pull wire connector
162 left portion, pull wire connector
164 right portion, pull wire connector
166 holes, pull wire connector
168 slot
170 recess
172 bracket
174 pull wire alignment aperture
176 pull wire tensioner
178 enlarged head, pull wire tensioner
180 threaded end, pull wire tensioner
182 slot, pull wire tensioner
184 nut, pull wire tensioner
186 slot, nut
188 back plate
190 flexure, back plate
192 fastening holes, back plate
193 lock-on
194 acutely-angled insert end
195 grip
196 pivot axis
197 plurality of pull wire connections
198 varying distance
199 torque increasing lever
200 bracket
201 first lever connection
202 second lever connection
203 holes, lever
204 pivot, lever
205 foot stand
206 upright back
207 kick barrier 208 weld
209 ceiling

What is claimed is:

1. A hands-free faucet control device, comprising:
   a) a water valve assembly, comprising:
      i) a continuously-formed injection molded valve housing comprising two cylindrically-shaped apertures disposed adjacent to one another, each cylindrically-shaped aperture having an open first end opposite a frustoconically-shaped second end and defining an axis of revolution through the cylindrically-shaped aperture and frustoconically-shaped second end, each frustoconically-shaped second end having a wide end opposite a narrow end, where the wide end is connected and contiguous to the cylindrically-shaped aperture, wherein a first fluid connection port is connected at the narrow end, and wherein each cylindrically-shaped aperture has a second fluid connection port disposed between the narrow end of the frustoconically-shaped second end and the open first end of the cylindrically-shaped aperture, wherein the first and second fluid connection ports are in fluidic communication with an interior portion of their respective frustoconically-shaped second ends, and wherein each cylindrically-shaped aperture and frustoconically-shaped second end are not in fluidic communication with the adjacently disposed cylindrically-shaped aperture and frustoconically-shaped second end;
      ii) two valves, each valve disposed within one of the respective cylindrically-shaped apertures and frustoconically-shaped second ends, where each valve is translatable along their respective axis of revolution, where each valve has a proximal end opposite a distal end, and where the valves are simultaneously movable between a closed position and an open position;
      iii) a pair of first fluidic seals, where each first fluidic seal is disposed between its respective valve and the cylindrically-shaped aperture, the pair of first fluidic seals preventing a fluid from flowing thereby;
      iv) a pair of second fluidic seals, where each second fluidic seal is disposed between its respective distal end of the valve and the narrow end of the frustoconically-shaped second end, where simultaneous translation of the valves opens and closes fluidic communication between the first fluid connection ports and the interior portion of the frustoconically-shaped second ends;
      v) a pair of springs, each spring pressing against their respective valves biasing the valves towards the closed position;
   b) a foot pedal assembly, comprising:
      i) a foot peddle bracket attachable to a structural support;
      ii) a foot pedal attached to the foot peddle bracket, where the foot pedal is movable between an up position and a down position; and
   c) a pull wire connected at a pull wire first end to the proximal end of the valve and connected at a pull wire second end to the foot pedal, wherein movement of the foot pedal to the down position by a user moves the valves to the open position.

2. The device of claim 1, including a cap attached to the valve housing disposed at the open first ends, where the cap includes a pair of holes which are aligned with the proximal ends of the two valves, wherein the pair of springs are captured between the cap and their respective valves.

3. The device of claim 2, including a pull wire connector, the pull wire connector attached at a middle portion to the pull wire first end, and the pull wire connector having a left portion opposite a right portion about the middle portion, where the left portion is connected to the proximal end of one of the two valves, and the right portion is connected to the proximal end of the other of the two valves.

4. The device of claim 3, including a bracket attached to the valve housing, where the bracket includes a pull wire alignment aperture disposed above the middle portion of the pull wire connector.

5. The device of claim 4, including a pull wire tensioner disposed within the pull wire alignment aperture of the bracket, where the pull wire is captured and disposed through the pull wire tensioner, where the pull wire tensioner is adjustably positioned in a translational direction which can move closer to and further from the pull wire connector thereby adjusting the tension of the pull wire.

6. The device of claim 1, including a back plate that captures the valve housing through the use of at least one flexure.

7. The device of claim 6, wherein the back plate comprises fastening holes.

8. The device of claim 6, wherein the back plate comprises a pull wire alignment aperture disposed above the middle portion of the pull wire connector.

9. The device of claim 8, including a pull wire tensioner disposed within the pull wire alignment aperture of the back plate, where the pull wire is captured and disposed through the pull wire tensioner, and where the pull wire tensioner is adjustably positioned in a translational direction which can move closer to and further from the pull wire connector thereby adjusting the tension of the pull wire.

10. The device of claim 2, including a lock-on, where the lock-on is configured to be placed by the user between the cap and the pull wire connector which then forces the two valves into the open position.

11. The device of claim 10, wherein the lock-on includes an acutely-angled insert end that is configured to be wedged between the cap and the valve housing by the user.

12. The device of claim 1, including a foot activated hold-down switch pivotably or flexurally attached to the foot pedal bracket.

13. The device of claim 12, wherein the foot activated hold-down switch includes a protrusion configured to engage a notch located on the foot peddle bracket.

14. The device of claim 1, wherein the foot peddle is pivotably connected to the foot peddle bracket about a pivot axis, and wherein the foot peddle comprises a plurality of pull wire connections for the pull wire second end to connect to, where the plurality of pull wire connections are at a varying distance from the pivot axis.

15. The device of claim 1, including a torque increasing lever, where the torque increasing lever is pivotably attached to the structural support or to a second structural support, wherein the pull wire comprises a first section which is separate from a second section, where the first section comprises the pull wire first end opposite a first lever connection, and the second section comprises the pull wire second end opposite a second lever connection, where the first and second lever connections are pivotably coupled to the torque increasing lever at a distance apart from one another.

16. The device of claim 1, wherein the pair of second fluidic seals are fastened onto their respective distal ends of the pair of valves or wherein the pair of second fluidic seals are molded onto their respective distal ends of the pair of valves.

17. The device of claim 1, wherein the pair of first fluidic seals comprise o-ring seals.

18. The device of claim 1, wherein each first fluidic seal of the pair of first fluidic seals comprises at least two o-rings disposed adjacently to one another.

19. The device of claim 1, wherein the spring comprises a compression spring.

20. The device of claim 1, wherein the structural support for the foot peddle bracket comprises a wall, a cabinet or a floor.

21. The device of claim 1, wherein the pull wire comprises a sheathing.

22. The device of claim 1, wherein the valve housing comprises continuously-formed fastening holes.

23. The device of claim 1, wherein the distal end of each valve is frustoconically-shaped.

24. The device of claim 23, wherein the frustoconically-shaped distal end of each valve matches the shape of the frustoconically-shaped second end of the valve housing.

25. A hands-free faucet control device, comprising:
   a) a water valve assembly, comprising:
      i) a continuously-formed injection molded valve housing comprising two cylindrically-shaped apertures disposed adjacent to one another, each cylindrically-shaped aperture having an open first end opposite a frustoconically-shaped second end and defining an axis of revolution through the cylindrically-shaped aperture and frustoconically-shaped second end, each frustoconically-shaped second end having a wide end opposite a narrow end, where the wide end is connected and contiguous to the cylindrically-shaped aperture, wherein a first fluid connection port is connected at the narrow end, and wherein each cylindrically-shaped aperture has a second fluid connection port disposed between the narrow end of the frustoconically-shaped second end and the open first end of the cylindrically-shaped aperture, wherein the first and second fluid connection ports are in fluidic communication with an interior portion of their respective frustoconically-shaped second ends, and wherein each cylindrically-shaped aperture and frustoconically-shaped second end are not in fluidic communication with the adjacently disposed cylindrically-shaped aperture and frustoconically-shaped second end;
      ii) two valves, each valve disposed within one of the respective cylindrically-shaped apertures and frustoconically-shaped second ends, where each valve is translatable along their respective axis of revolution, where each valve has a proximal end opposite a distal end, and where the valves are simultaneously movable between a closed position and an open position;
      iii) a pair of first fluidic seals, where each first fluidic seal is disposed between its respective valve and the cylindrically-shaped aperture, the pair of first fluidic seals preventing a fluid from flowing thereby;
      iv) a pair of second fluidic seals, where each second fluidic seal is disposed between its respective distal end of the valve and the narrow end of the frustoconically-shaped second end, where simultaneous translation of the valves opens and closes fluidic communication between the first fluid connection ports and the interior portion of the frustoconically-shaped second ends;
      v) a pair of springs, each spring pressing against their respective valves biasing the valves towards the closed position;
   b) a foot pedal assembly, comprising:
      i) a foot peddle bracket attachable to a structural support;
      ii) a foot pedal attached to the foot peddle bracket, where the foot pedal is movable between an up position and a down position;
   c) a pull wire connected at a pull wire first end to the proximal end of the valve and connected at a pull wire second end to the foot pedal, wherein movement of the foot pedal to the down position by a user moves the valves to the open position;
   d) a cap attached to the valve housing disposed at the open first ends, where the cap includes a pair of holes which are aligned with the proximal ends of the two valves, wherein the pair of springs are captured between the cap and their respective valves; and
   e) a pull wire connector, the pull wire connector attached at a middle portion to the pull wire first end, and the pull wire connector having a left portion opposite a right portion about the middle portion, where the left portion is connected to the proximal end of one of the two valves, and the right portion is connected to the proximal end of the other of the two valves.

26. A hands-free faucet control device, comprising:
   a) a water valve assembly, comprising:
      i) a continuously-formed injection molded valve housing comprising two cylindrically-shaped apertures disposed adjacent to one another, each cylindrically-shaped aperture defining an axis of revolution and having an open first end opposite a first fluid connection port, wherein each cylindrically-shaped aperture has a second fluid connection port attached to the valve housing and disposed between the open first end and the first fluid connection port, wherein the first and second fluid connection ports are in fluidic communication with an interior portion of their respective cylindrically-shaped apertures, and wherein each cylindrically-shaped aperture is not in fluidic communication with the adjacently disposed cylindrically-shaped aperture;
      ii) two valves, each valve disposed within one of the respective cylindrically-shaped apertures, where each valve is translatable along their respective axis of revolution, where each valve has a proximal end opposite a distal end, and where the valves are simultaneously movable between a closed position and an open position;
      iii) a pair of first fluidic seals, where each first fluidic seal is disposed between its respective valve and the cylindrically-shaped aperture, the pair of first fluidic seals preventing a fluid from flowing thereby;
      iv) a pair of second fluidic seals, where each second fluidic seal is disposed between its respective distal end of the valve and first fluid connection port, where simultaneous translation of the valves opens and closes fluidic communication between the first fluid connection ports and the interior portion of the cylindrically-shaped apertures;
      v) a pair of springs, each spring pressing against their respective valves biasing the valves towards the closed position;

b) a foot pedal assembly, comprising:
  i) a foot peddle bracket attachable to a structural support;
  ii) a foot pedal attached to the foot peddle bracket, where the foot pedal is movable between an up position and a down position;
c) a pull wire connected at a pull wire first end to the proximal end of the valve and connected at a pull wire second end to the foot pedal, wherein movement of the foot pedal to the down position by a user moves the valves to the open position.

* * * * *